(12) United States Patent
Lin et al.

(10) Patent No.: US 11,092,473 B1
(45) Date of Patent: Aug. 17, 2021

(54) CUP HAVING MEASUREMENT INDICATORS

(71) Applicant: Olababy Incorporated, Hillsboro, OR (US)

(72) Inventors: Qiao Lin, Bellevue, WA (US); Paul Wang, Portland, OR (US)

(73) Assignee: OLABABY INCORPORATED, Beaverton, OR (US)

( * ) Notice: Subject to any disclaimer, the term of this patent is extended or adjusted under 35 U.S.C. 154(b) by 0 days.

(21) Appl. No.: 16/792,164

(22) Filed: Feb. 14, 2020

(51) Int. Cl.
  *G01F 19/00* (2006.01)
  *A47G 19/22* (2006.01)
  *B65D 81/38* (2006.01)

(52) U.S. Cl.
  CPC .......... *G01F 19/00* (2013.01); *A47G 19/22* (2013.01); *B65D 81/3865* (2013.01)

(58) Field of Classification Search
  CPC .......... G01F 19/00; B65D 2543/00046; B65D 1/265; B65D 43/02; A47G 19/2272; A47G 19/2205
  USPC ............................ 73/427; 220/713, 703, 711
  See application file for complete search history.

(56) References Cited

U.S. PATENT DOCUMENTS

| | | | | |
|---|---|---|---|---|
| 3,868,043 A | * | 2/1975 | Freemyer | B65D 21/0219 220/712 |
| 4,986,437 A | * | 1/1991 | Farmer | B65D 43/0212 220/713 |
| 5,607,078 A | * | 3/1997 | Nordberg | A47G 23/16 116/227 |
| 5,699,937 A | * | 12/1997 | Canela | A47G 19/2205 222/129 |
| 8,469,225 B2 | | 6/2013 | Fredland | |
| D791,543 S | * | 7/2017 | Mulhauser | D7/510 |
| 10,729,262 B2 | * | 8/2020 | Fleming | A47G 19/2272 |
| 10,815,037 B2 | * | 10/2020 | Brannock | B65D 43/06 |
| 2012/0181291 A1 | * | 7/2012 | Fredland | A47G 19/2205 220/666 |
| 2012/0241453 A1 | * | 9/2012 | Palmer | B65D 47/06 220/254.3 |
| 2015/0201777 A1 | * | 7/2015 | Kim | A47G 23/0216 220/713 |

* cited by examiner

*Primary Examiner* — Nimeshkumar D Patel
*Assistant Examiner* — Jean F Morello
(74) *Attorney, Agent, or Firm* — Millburn IP PLLC

(57) ABSTRACT

A cup includes a body having a cylindrical shape. The body includes a plurality of measurement indicators provided at an exterior surface of the body. The cup also includes a base integrally formed with the body. The body and the base are formed based on a silicone material.

4 Claims, 52 Drawing Sheets

CUP HAVING MEASUREMENT INDICATORS

TECHNICAL FIELD

The present disclosure relates to the technology field of cups and, more particularly, to a cup having measurement indicators.

BACKGROUND

Cups are typical devices people use in their daily life for drinking and/or storing liquid. Sometimes cups are used for training young children, such as those who are in the age of learning to drinking water or milk by themselves. Sometimes cups are used for taking liquid medicine by, e.g., young children or the elderly. Most drinking cups available on the market, especially those for training young children, do not have measurement indicators (e.g., scales) on the body of the cups. Often times, in order to give a young children a certain amount of milk or baby formula, a parent has to prepare the milk or baby formula in a separate measuring cup (which may be too large or heavy for the young children to use as a drinking cup directly) and then pour the milk or baby formula into a separate drinking cup.

SUMMARY

In accordance with an aspect of the present disclosure, there is provided a cup including a body having a cylindrical shape. The body includes a plurality of measurement indicators provided at an exterior surface of the body. The cup also includes a base integrally formed with the body. The body and the base are formed based on a silicone material.

In accordance with another aspect of the present disclosure, there is provided a drinking cup assembly. The drinking cup assembly includes a cup and a lid coupled with a top portion of the cup. The cup includes a body having a cylindrical shape, and including a plurality of measurement indicators provided at an exterior surface of the body. The cup also includes a base integrally formed with the body. The body and the base are formed based on a silicone material. The lid includes a slanted center plate having a hole configured for drinking.

In accordance with another aspect of the present disclosure, there is provided a lid for a cup. The lid includes a cylindrical body. The lid also includes a slanted center plate including a hole configured for drinking. The slanted center plate is slanted lower toward the hole.

BRIEF DESCRIPTION OF THE DRAWINGS

To better describe the technical solutions of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DETAILED DESCRIPTION

Figure 1:
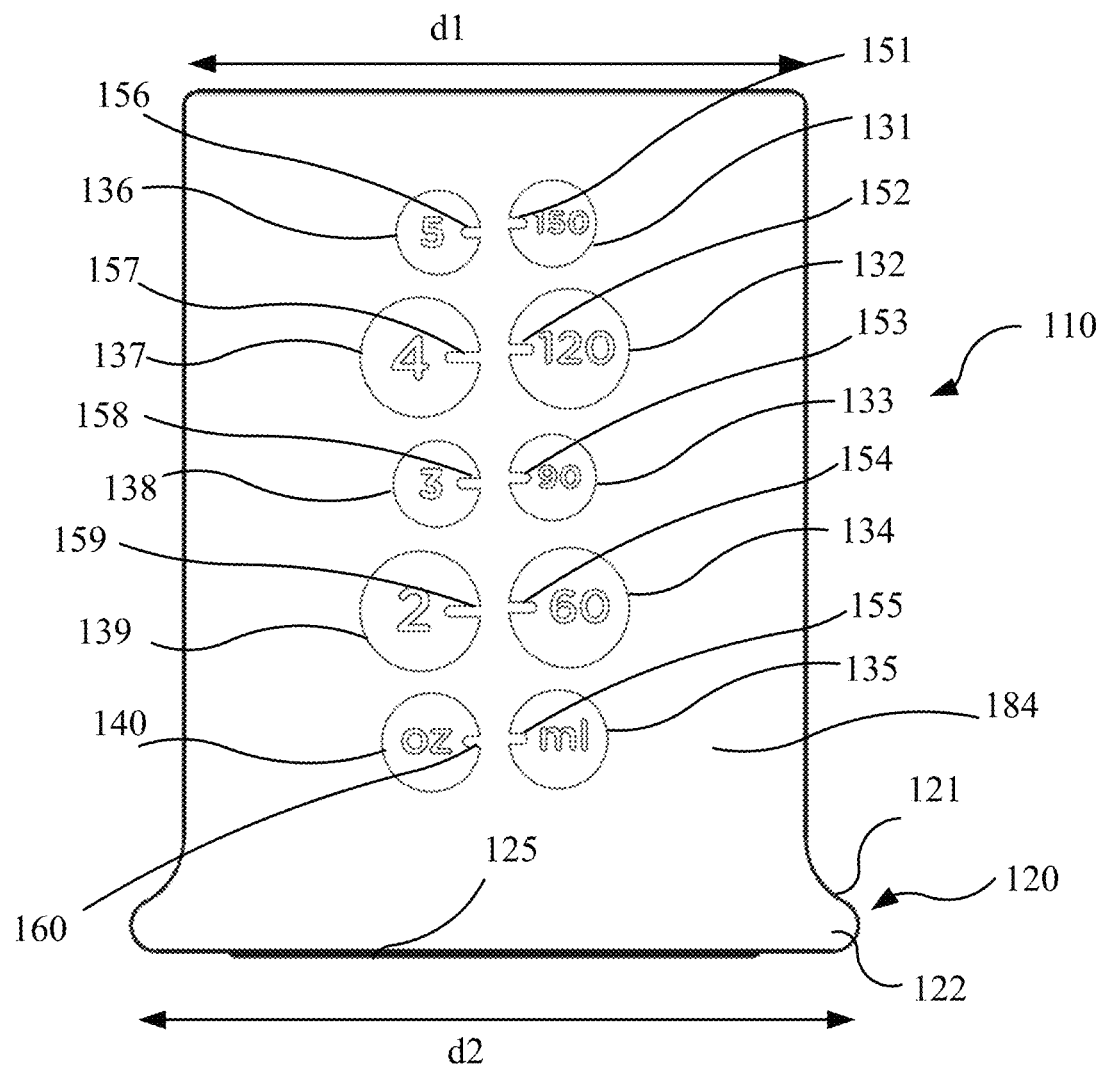
FIG. 1 is a schematic illustration of a front view of a cup, according to an embodiment of the present disclosure.

Technical solutions of the present disclosure will be described in detail with reference to the drawings, in which the same numbers refer to the same or similar elements unless otherwise specified. A person having ordinary skills in the art would appreciate that the described embodiments represent some, rather than all, of the embodiments of the present disclosure. A person having ordinary skills in the art can conceive or derive other embodiments or variations based on the described embodiments. Such embodiments also fall within the scope of the present disclosure.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, when a first component (or unit, element, member, part, piece) is referred to as "coupled" to or with a second component, it is intended that the first component may be directly or indirectly, permanently or removably, coupled, mounted, fixed, connected, or secured to or with the second component.

When a first component is referred to as "disposed," "located," or "provided" at a second component, the first component may be partially or entirely, directly or indirectly, disposed, located, or provided in, inside, within, on, below, or above the second component. The first component may be disposed, located, or provided at any suitable orientation (back, front, to the left, to the right, above, or below) relative to the second component.

The singular forms of "a," "an," and "the" are intended to include the plural forms as well, unless the context indicates otherwise. The terms "comprise," "comprising," "include," and the like specify the presence of stated features, steps, operations, elements, and/or components, and do not preclude the presence or addition of one or more other features, steps, operations, elements, components, and/or groups.

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" has a meaning similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include one such element. The number of elements illustrated in the drawing is for illustration purposes only, and should not be construed as limiting the scope of the embodiment. Moreover, the embodiments and/or features included in various embodiments shown in the drawings are not mutually exclusive, and they may be combined in any suitable manner. For example, elements shown in only one embodiment (or figure) may nevertheless be included in the other embodiments (or figures).

FIG. 1 is a schematic illustration of a front view of a cup 100. The cup 100 may include a body 110 having a substantially cylindrical shape and a base 120 having a round shape. The shapes of the body 110 and the base 120 are not limited to those shown in FIG. 1. Any suitable shape may be used. For example, the body 110 may include a cubical or rectangular prism shape, and the base 120 may include a square or a rectangular shape. In some embodiments, the body 110 may by a substantially cylindrical shape having an oval cross section, and the base 120 may have an oval shape.

The cup 100 may be made of or may include a transparent or translucent material. In some embodiment, the transparent or translucent material may be a flexible (e.g., elastic) material having a certain level of softness (e.g., less hard than plastics). For example, the cup 100 may deform when a user applies a force on the cup 100 while holding the cup 100. When the force is released, the cup 100 may restore its original shape. In one embodiment, the cup 100 may be made of silicone, or a material including silicone, which may be flexible, and non-toxic and safe for humans. In some embodiments, the entire cup 100 is made of silicone. In some embodiments, the silicone may be food-grade silicone, which may be suitable for containing food, liquid (e.g., water, juice, milk, baby formula, etc.). The food-grade silicone may have a high purity, which makes the silicone appear transparent or at least translucent. Transparent silicone material is not commonly used for making cups, due to its higher cost and more complex manufacturing processes as compared to non-transparent (or non-translucent) silicone, which contains more impurities, costs less, and involves less complex manufacturing processes. The non-transparent (or non-translucent) silicone may be found in toys, kitchen utensils, etc.

In some embodiments, the entire cup 100 may be made of food-grade silicone, and may not include any paint, metal, or other harmful chemical components that may be unsafe for humans, such as for young children. During the manufacturing process, a high-purity transparent silicone may be used to make the cup 100. After the cup 100 is formed, e.g., by molding, to increase friction when the cup 100 is held by a hand of a user, a special process (e.g., etching, sandblasting, etc.) may be applied to the cup 100 to make the silicone less transparent, for example, translucent (e.g., frosted or matte), except for predetermined areas or regions relating to the measurement indicators, which are left as transparent (described in detail below).

In some embodiments, the body 110 and the base 120 may be formed as an integral piece. That is, the entire cup 100 may be formed as a single piece. For example, the cup 100 may be formed through injection molding, 3D printing, or any other suitable manufacturing processes.

The substantially cylindrically shaped body 110 may have an outer diameter d1. The outer diameter d1 may remain substantially the same in the vertical direction for the body 110. The inner diameter of the body 110 is not illustrated by arrows in FIG. 1. The thickness of the wall (e.g., the difference between the outer diameter d1 and the inner diameter) of the body 110 may be a suitable thickness, such as 2 millimeters, 3 millimeters, 4 millimeters, etc. The base 120 may include a top portion 121 and a bottom portion 122. The top portion 121 may have a gradually increased diameter, forming a smooth transition from a bottom portion of the cylindrically shaped body 110 to the bottom portion 122. The bottom portion 122 may have a diameter d2 (the outermost diameter). The diameter d2 may be greater than the diameter d1. The base 120 may also include a ring-shaped protrusion 125 protruding from a bottom surface of the bottom portion 122. The ring-shaped protrusion 125 may increase the stability of the cup 100 when the cup 100 is placed on a flat surface, such as a table.

Although not shown, in some embodiments, the outer diameter d1 may gradually increase from the top portion to the bottom portion of the body 110, or may gradually decrease from the top portion to the bottom portion of the body 110.

As shown in FIG. 1, the body 110 may include a plurality of measurement indicators provided at an exterior surface 184 of the body 110 (e.g., at a front side shown in FIG. 1). In some embodiments, the plurality of measurement indicators may include a plurality of measurement scales 151, 152, 153, 154, 155, 156, 157, 158, 159, and 160. In some embodiments, when the body 110 is translucent, the scales 151-160 may also be translucent. The measurement scales 151-160 may be arranged in two vertical columns, one column in a unit of ounce ("oz" shown in FIG. 1), and the other column in a unit of milliliter ("ml" shown in FIG. 1). In the embodiment shown in FIG. 1, each scale may be accompanied by a number, e.g., 5, 4, 3, 2, 150, 120, 90, 60, or by letters such as "oz" or "ml." Thus, the measurement scales may indicate the volume of the liquid contained in the cup 100. In some embodiments, the numbers and letters may also be translucent.

In some embodiments, the scales, numbers, or letters may be formed on the body 110 through a suitable manufacturing method, such as etching (e.g., metal etching), abrasive blasting, printing (including 3D printing), extruding, carving, cutting, engraving, etc. In some embodiments, the scales, numbers, or letters may be indented, depressed, or recessed from the exterior surface 184 of the body 110 (e.g., below the exterior surface 184 of the body 110). In some embodiments, the scales, numbers, or letters may be protrusions from the exterior surface 184 of the body 110. In the embodiments shown in FIG. 1-20, measurement indicators, such as the scales, numbers, or letters are substantially flush with the exterior surface 184 of the body 110. For example, the scales, numbers, or letters may be formed at the originally transparent surface of the silicone material by etching during the process in which the exterior surface 184 of the body 110 is made translucent.

In the embodiment shown in FIG. 1, each scale and the associated number or letters may be located within a transparent measurement scale window 131, 132, 133, 134, 135, 136, 137, 138, 139, or 140. The measurement scale windows 131-140 may have the same size or may have different sizes. In the embodiment shown in FIG. 1, the windows 131-140 have different sizes. In the vertical direction (two columns), the windows have different sizes are alternatingly arranged, which may provide an easy identification of the scales and the level of the liquid contained in the cup 100. In the horizontal direction, the two windows in the same row may have the same size or may have different sizes. Although two columns of windows are included in the embodiment shown in FIG. 2, in some embodiments, there may be only one column, such as a column with unit "oz" or a column with unit "ml." The transparent measurement scale windows may be formed on the exterior surface 184 of the body 110 to be flush with the exterior surface 184. The windows are portions of the exterior surface 184 that remain unprocessed when the rest of the exterior surface 184 is processed to roughen the surface to become translucent (the original silicone material may be transparent).

During the manufacturing process, the cup 100 may be formed by molding with a transparent, high-purity silicone. After the transparent cup 100 is formed, a special process (e.g., etching, abrasive blasting such as sandblasting) may be applied to process the surfaces of the entire cup 100. Areas, such as the areas corresponding to the measurement scale windows, either on the exterior surface 184 of the body 110 or the interior surface of the body 110, which are intended to remain transparent in the final product may be covered by protective pads or sheets. The special process may roughen the surfaces of the cup 100 that are exposed to the special process, thereby making the cup translucent. The areas where the scales, numbers, and letters are located are also subject to the special process (e.g., etching), and hence are made translucent (e.g., frosted, matte) in the final product. The transparent window and the translucent scale and number or letters within the window, as well as the surface of the liquid contained in the cup 100 may form a contrast, which enables easy readying of the level of the surface of the liquid contained in the cup 100.

The transparent measurement scale windows 131-140 (referred to as a first plurality of transparent windows) may extend from the exterior surface 184 of the body 110 to the interior surface of the body 110. In other words, on the interior surface of the body 110, a second plurality of transparent windows may be formed at locations corresponding to the locations of the first plurality of windows 131-140 formed on the exterior surface 184 of the body 110. In some embodiments, the sizes (e.g., diameters when the windows are circular) of the second plurality of transparent windows formed on the interior surface may be the same as the sizes of the first plurality of transparent windows 131-140 formed on the exterior surface 184. In some embodiments, the sizes (e.g., diameters when the windows are circular) of the second plurality of transparent windows formed on the interior surface may be larger (e.g., slightly larger) than the sizes of the first plurality of transparent windows 131-140 formed on the exterior surface 184. Due to optical effects (e.g., refraction, diffraction, etc.), having a larger transparent window provided on the interior surface may provide better reading of the surface level of the liquid contained in the cup 100. The shapes of the transparent measurement scale windows 131-140 (and the second plurality of transparent windows on the interior surface) are not limited to circles. Any other suitable shapes may be used. Portions of the interior surface of the cup outside of the second plurality of transparent windows may be processed during the manufacturing process to be translucent.

Figure 2:
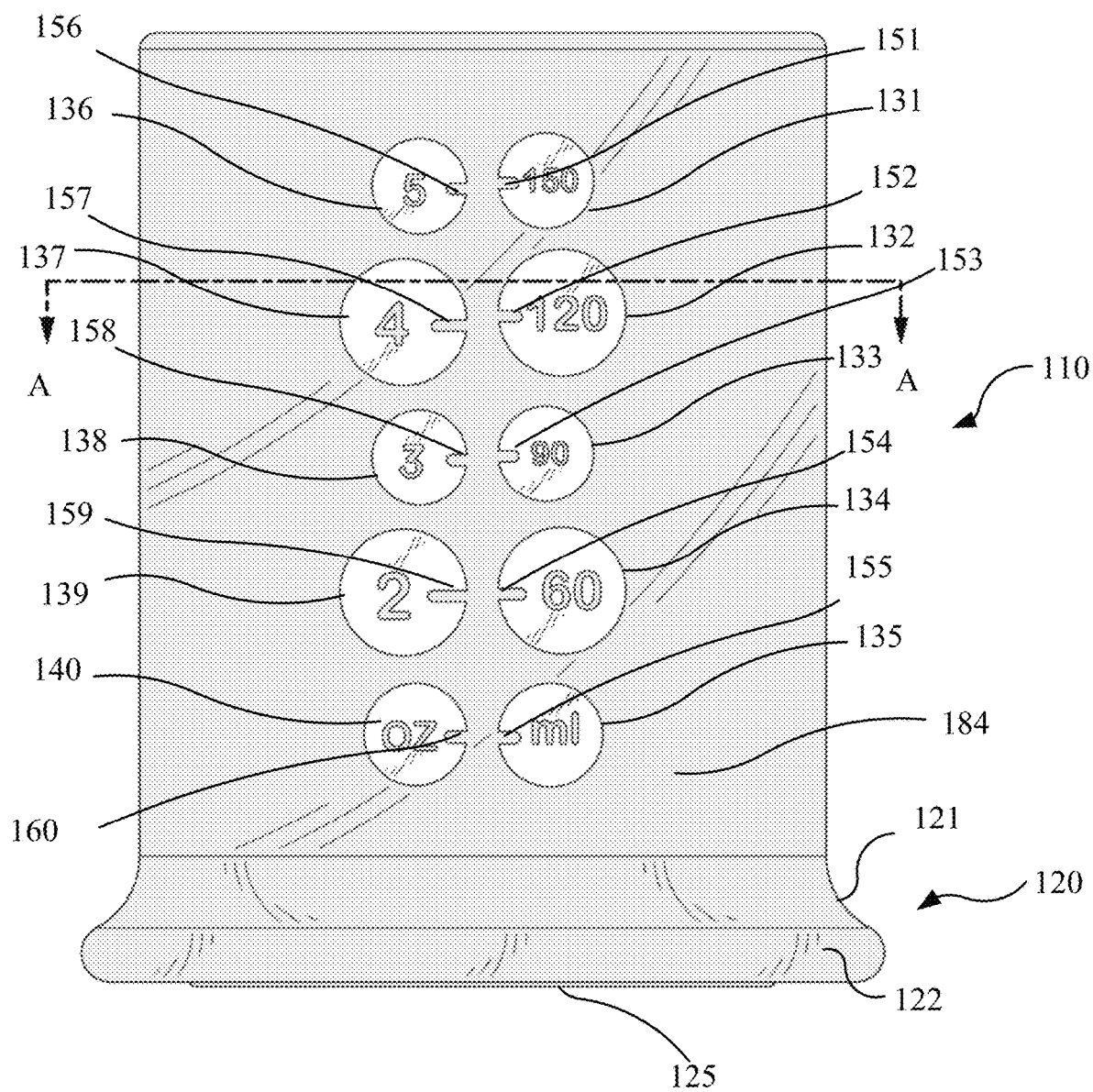
FIG. 2 is a schematic illustration of another front view of a cup, according to an embodiment of the present disclosure.

FIG. 2 is a schematic illustration of another front view of the cup 100. Light (gray) shades are added to the cup 100 to indicate that the entire cup 100 is translucent (e.g., frosted, matte), except for the windows 131-140, which are transparent. The numbers and scales are also translucent.

Figure 3:
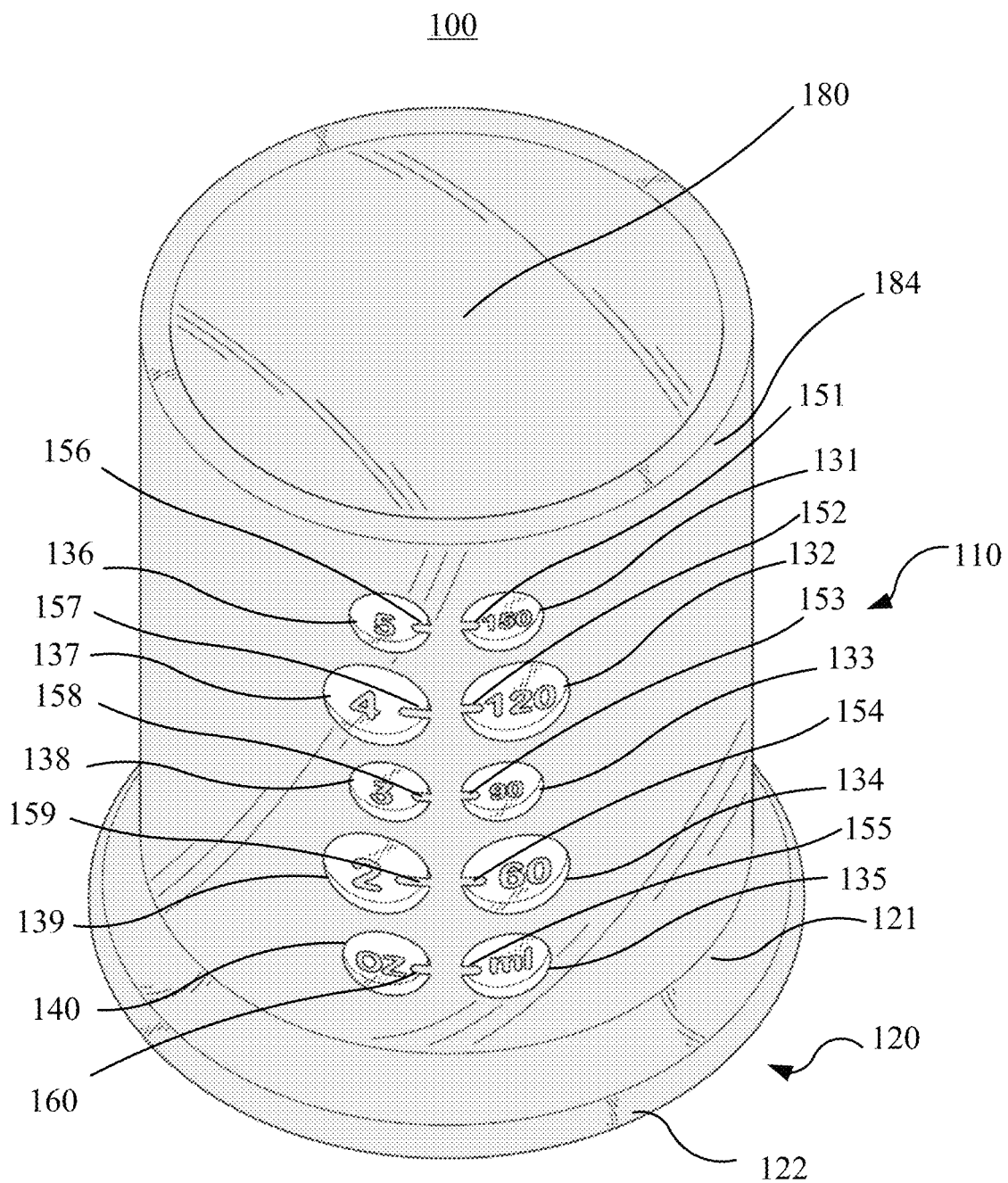
FIG. 3 is a schematic illustration of a front perspective view of a cup, according to an embodiment of the present disclosure.

FIG. 3 is a schematic illustration of a front perspective view of the cup 100. As shown in FIG. 3, in this embodiment, an interior surface 180 of the body 110 is translucent.

Figure 4:
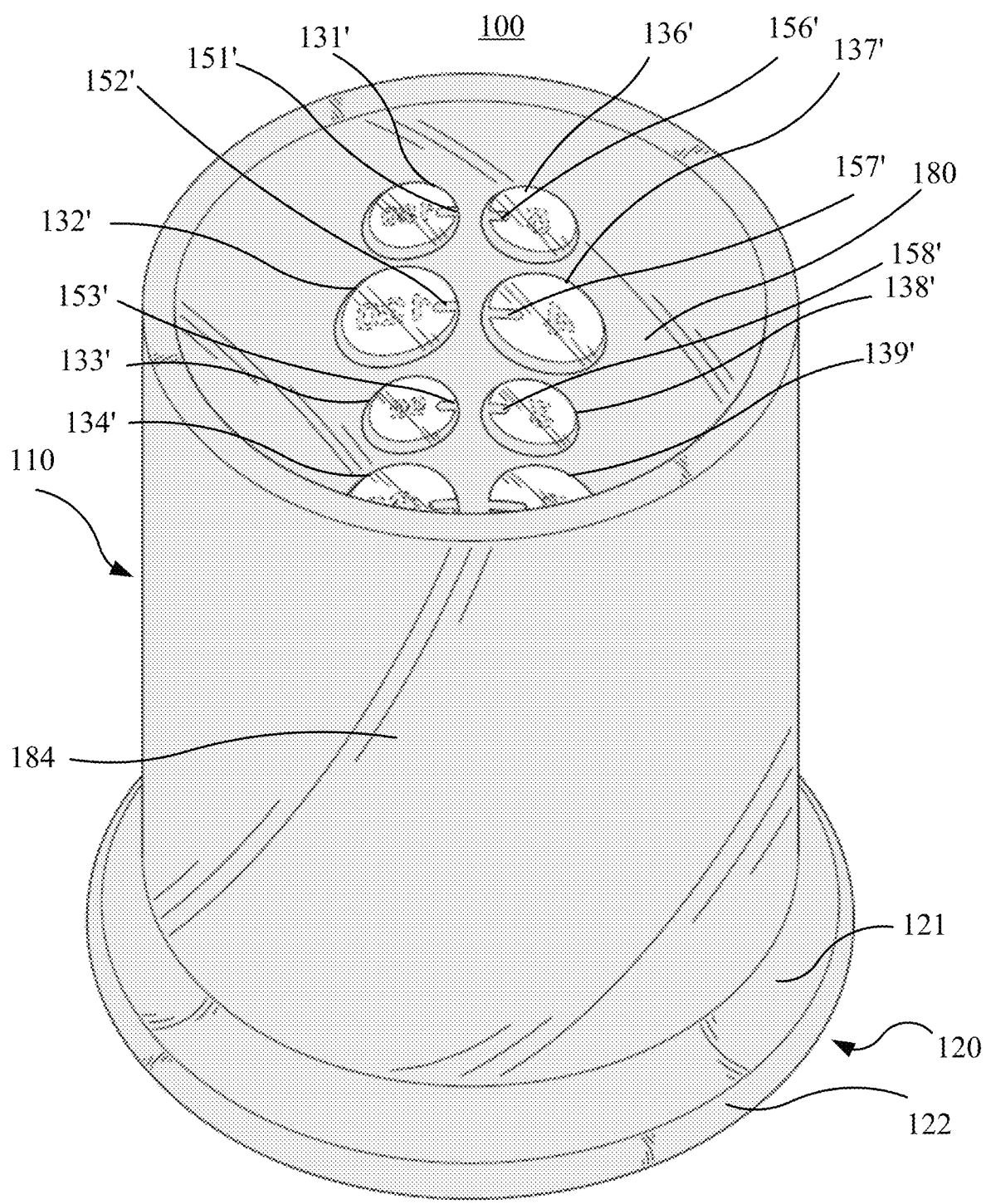
FIG. 4 is a schematic illustration of a back perspective view of a cup, according to an embodiment of the present disclosure.

FIG. 4 is a schematic illustration of a back perspective view of the cup 100. As shown in FIG. 4, in this embodiment, the measurement scales, numbers, letters, and windows are not provided on a back side of the exterior surface 184 of the body 110. As shown in FIG. 4, which illustrates a back perspective view of the cup 100, transparent windows are formed on the interior surface of the body 110. Each transparent measurement scale window 131-140 on the front side of the exterior surface 184 of the body 110 may be associated with a corresponding transparent measurement scale window 131'-140' (only some are shown/visible in the view of FIG. 4) provided on the interior surface 180. FIG. 4 show the transparent measurement scale windows 131', 132', 133', 134', 136', 137', 138', and 139' (135' and 140' are not observable in the view of FIG. 4). The transparent measurement scale windows 131'-140' may be formed in the same manner (e.g., etching) through which the windows 131-140 are formed at the front side of the exterior surface 184 of the body 110. In some embodiments, the size of the transparent measurement scale window 131-140 on the front side of the exterior surface 184 may be the same as the size of the transparent measurement scale window 131'-140', respectively. In some embodiments, the size of the transparent measurement scale window 131-140 on the front side of the exterior surface 184 may be slightly smaller than the size of the transparent measurement scale window 131'-140', respectively. The slightly larger sizes of the transparent measurement scale windows 131'-140' may compensate for the optical effect caused by the difference in the refractive indices of liquid and silicone, thereby enabling easy reading of the scales and numbers/letters from the front side of the exterior surface 184 when a liquid is contained in the cup 100. As shown in FIG. 4, images of the scales and mirror images of the numbers are visible through the transparent measurement scale windows 131'-140'. Reference numbers 151', 152', 156', and 157' indicate the images of the scales 151, 152, 156, and 157 provided at the front side of the exterior surface 184 of the body 110, which are visible from the back side perspective due to the transparency of the windows. In the embodiment shown in FIG. 4, the scales, numbers, and letters are not provided on the interior surface 180 of the cup 100.

Figure 5:
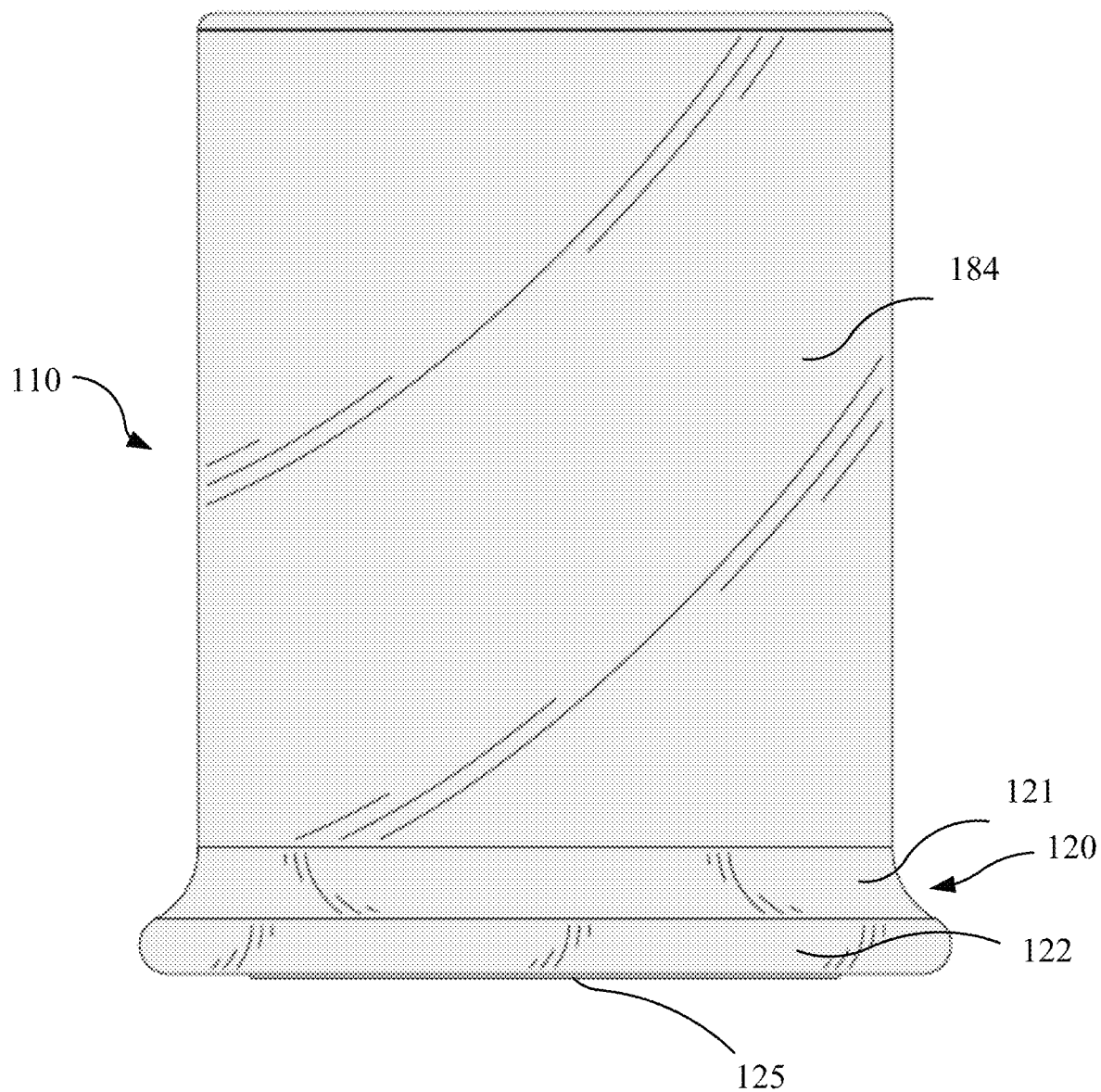
FIG. 5 is a schematic illustration of a back view of a cup, according to an embodiment of the present disclosure.

FIG. 5 is a schematic illustration of a back view of the cup 100. As shown in this embodiment, the scales, numbers, letters, and transparent measurement scale windows are not provided at the back side of the exterior surface 184 of the cup 100. That is, in the illustrated embodiment, the measurement scales, numbers, letters, and transparent measurement scale windows are only provided on the front side of the exterior surface 184 of the body 110. In some embodiments, the measurement scales, numbers, letters, and windows may also be provided on the back side of the exterior surface 184. In addition, in some embodiments, the measurement scales, numbers, letters, and windows may be provided on four sides of the exterior surface 184, separated from each other by about 90 degrees, e.g., a front side of the exterior surface 184, a back side of the exterior surface 184, a left side of the exterior surface 184, and a right side of the exterior surface 184. Having the measurement scales, numbers, letters, and windows provided on multiple sides of the exterior surface 184 may provide convenience for a user, such that the user may easily identify the level of the surface of the liquid contained in the cup 100 from any horizontal orientation without turning the cup 100. As noted above, in some embodiments, the scales, numbers, letters, and transparent measurement scale windows are not provided on the exterior surface 184 at the back side of the cup 100.

Figure 6:
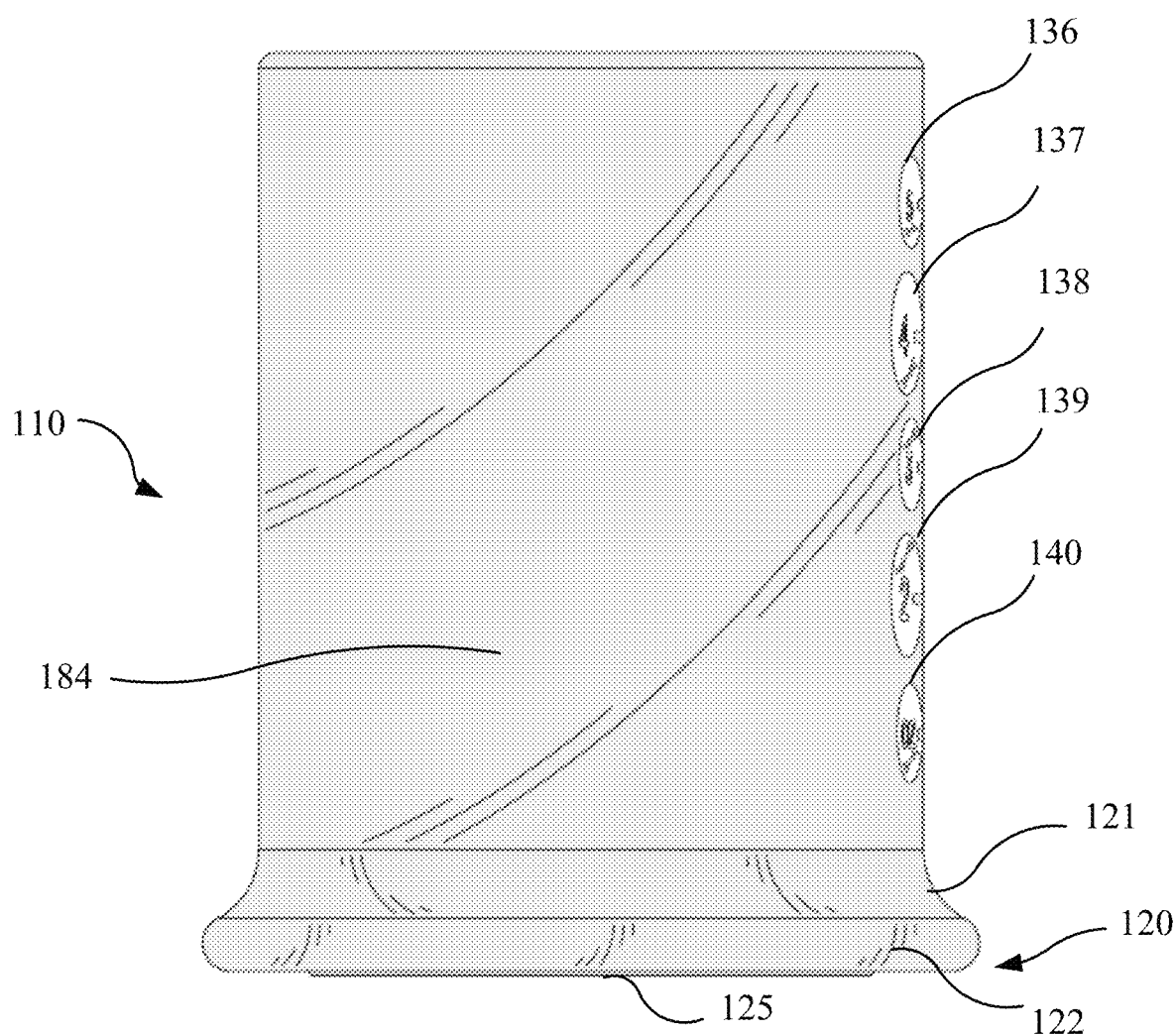
FIG. 6 is a schematic illustration of a left side view of a cup, according to an embodiment of the present disclosure.
Figure 7:
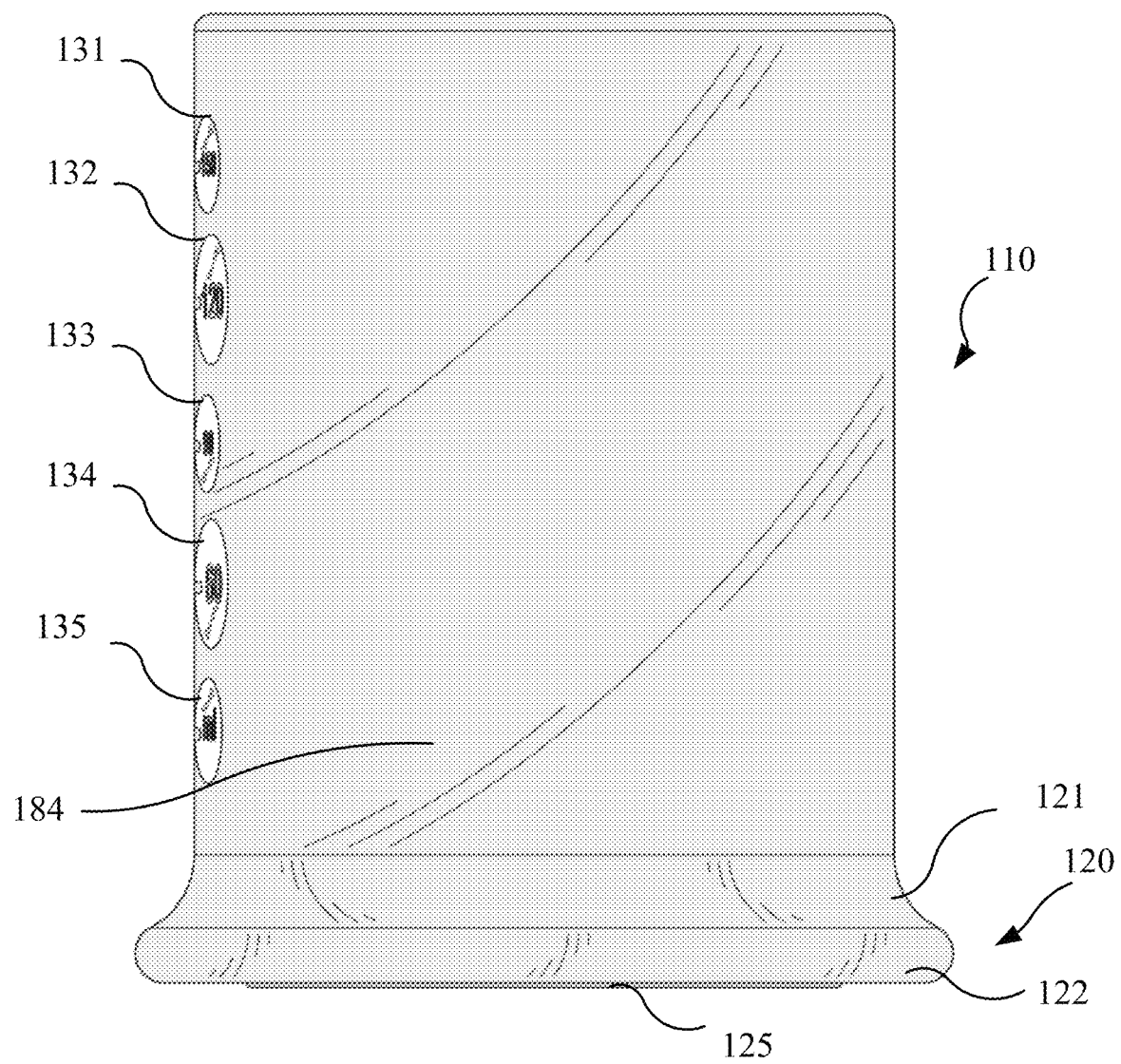
FIG. 7 is a schematic illustration of a right side view of a cup, according to an embodiment of the present disclosure.

FIG. 6 is a schematic illustration of a left side view of the cup 100. FIG. 7 is a schematic illustration of a right side view of the cup 100.

Figure 8:
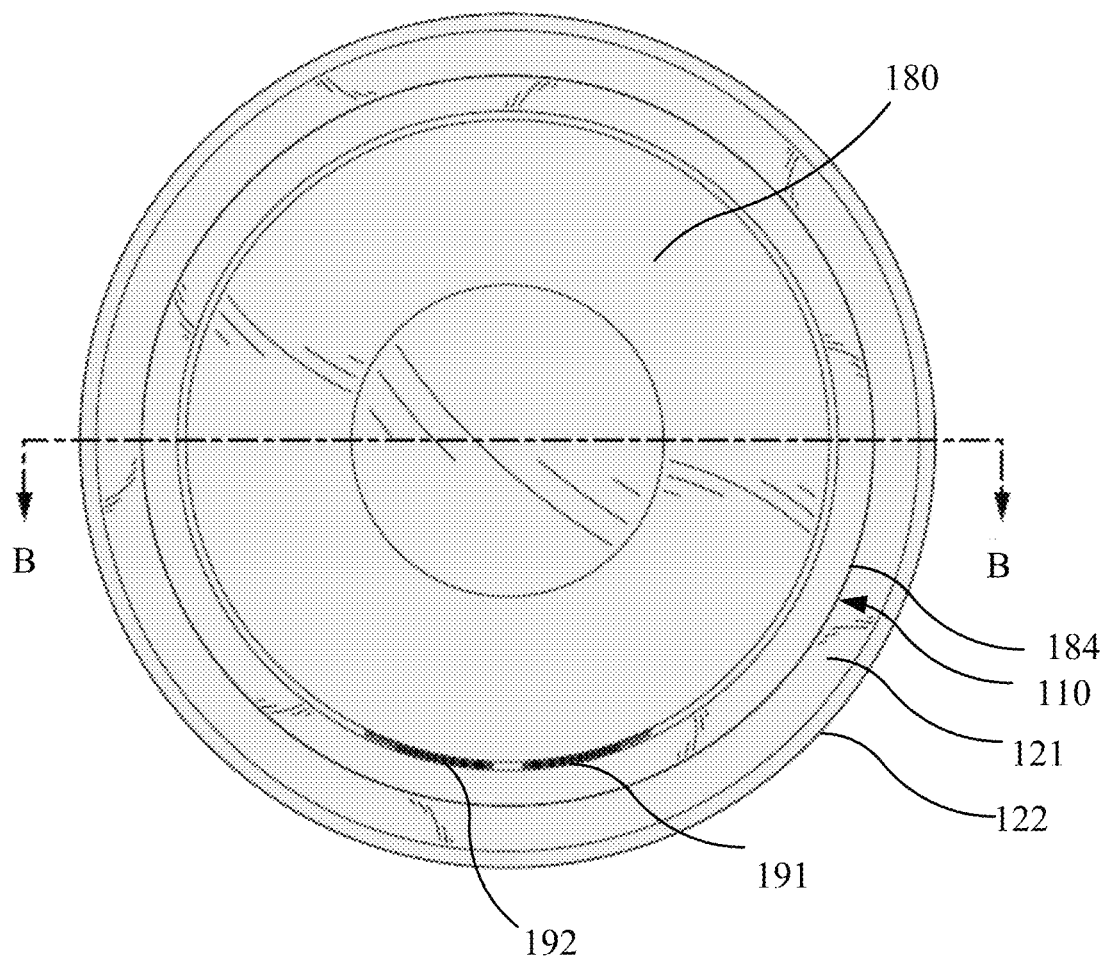
FIG. 8 is a schematic illustration of a top view of a cup, according to an embodiment of the present disclosure.
Figure 12:
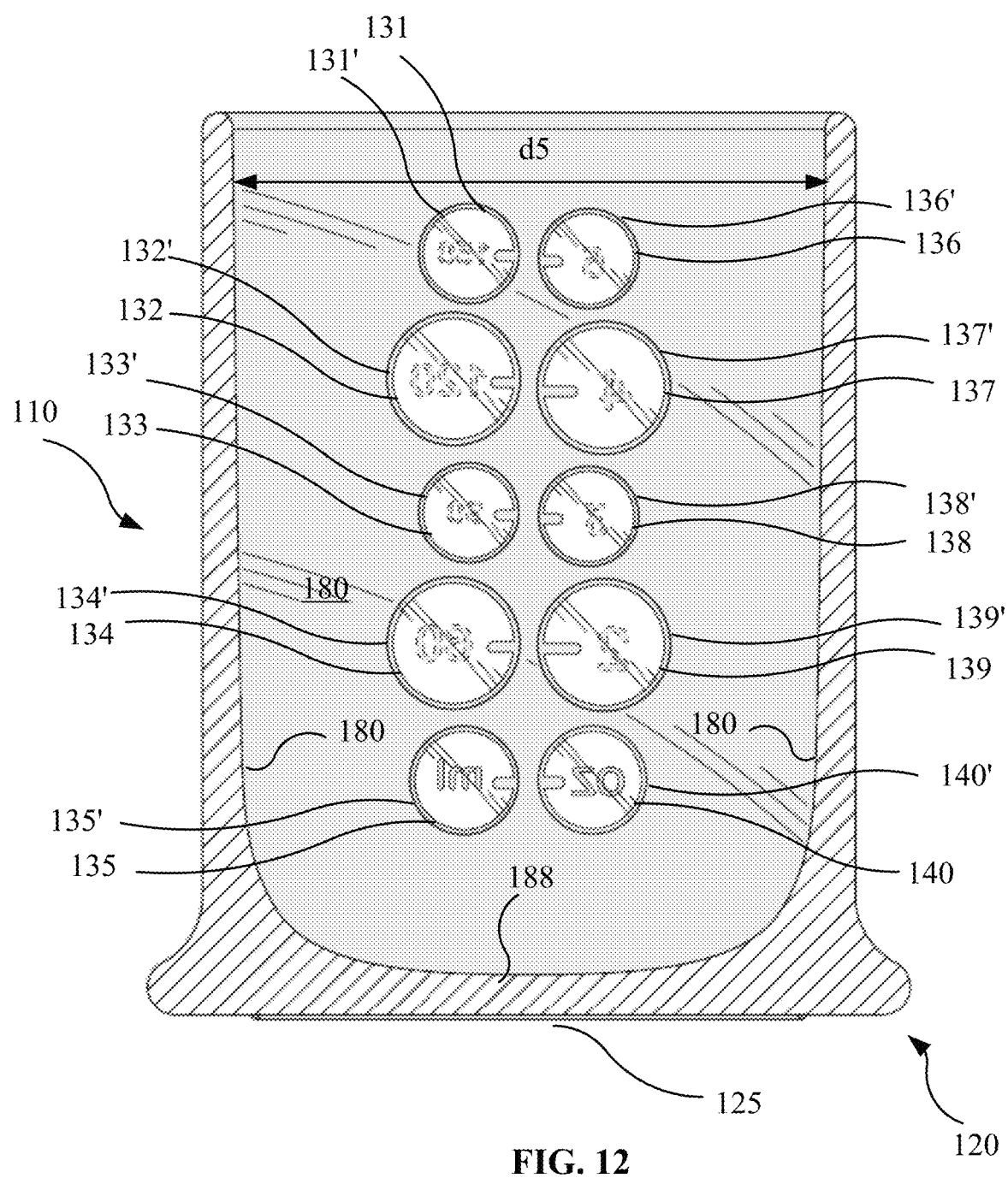
FIG. 12 is a schematic illustration of another cross-sectional view of a cup, according to an embodiment of the present disclosure.

FIG. 8 is a schematic illustration of a top view of the cup 100. Reference numbers 191 and 192 indicate that some of the measurement indicators (e.g., measurement scales, numbers, or letters) provided on the front side of the exterior surface 184 are visible through the transparent interior surface 180, which may be slightly curved as shown in FIG. 12.

Figure 9:
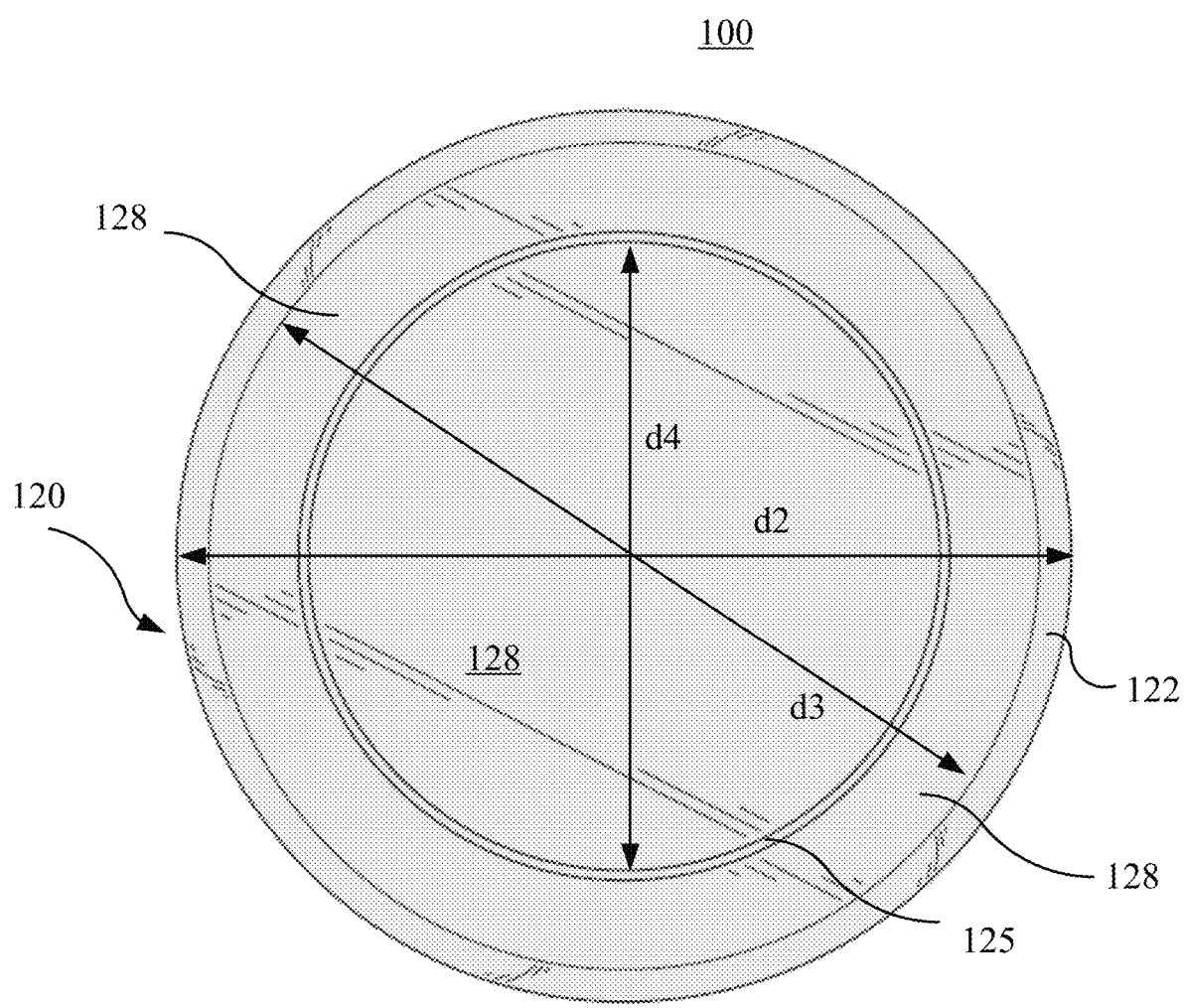
FIG. 9 is a schematic illustration of a bottom view of a cup, according to an embodiment of the present disclosure.

FIG. 9 is a schematic illustration of a bottom view of the cup 100. As shown in the bottom view, the base 120 includes the ring-shaped protrusion 125 (also shown in, e.g., FIG. 2). The base 120 includes a bottom surface 128, which may be flat. The bottom surface 128 may include a circular shape having a diameter d3. The diameter d3 may be slightly smaller than the outer diameter d2 of the base 120. The ring-shaped protrusion 125 may protrude from the bottom surface 128. The ring-shaped protrusion 125 may be concentric with the circular bottom surface 128. The ring-shaped protrusion 125 may have a diameter d4 that is smaller than the diameter d3 of the bottom surface 128. The thickness of the ring-shaped protrusion 125 and the height (the height shown in the side view of FIG. 2) of the ring-shaped protrusion 125 may be any suitable thickness and height. For example, the height of the ring-shaped protrusion 125 may be in the range of 1 mm to 5 mm. The ring-shaped protrusion 125 may support the cup 100 when the cup 100 is placed on a surface, such as a table. The ring-shaped protrusion 125 may increase the stability of the cup 100. If the bottom surface 128 is used to support the cup 100 (i.e., if the ring-shaped protrusion 125 is not included), due to the flexibility of the silicone material, the bottom surface 128 may not be flat when the cup 100 contains liquid. For example, the bottom surface 128 may deform due to thermal effect of the hot or cold liquid contained therein, or may deform due to the gravity of the liquid. The ring-shaped protrusion 125 may provide a more stable support to the cup 100 than a flat and flexible bottom surface.

Figure 10:
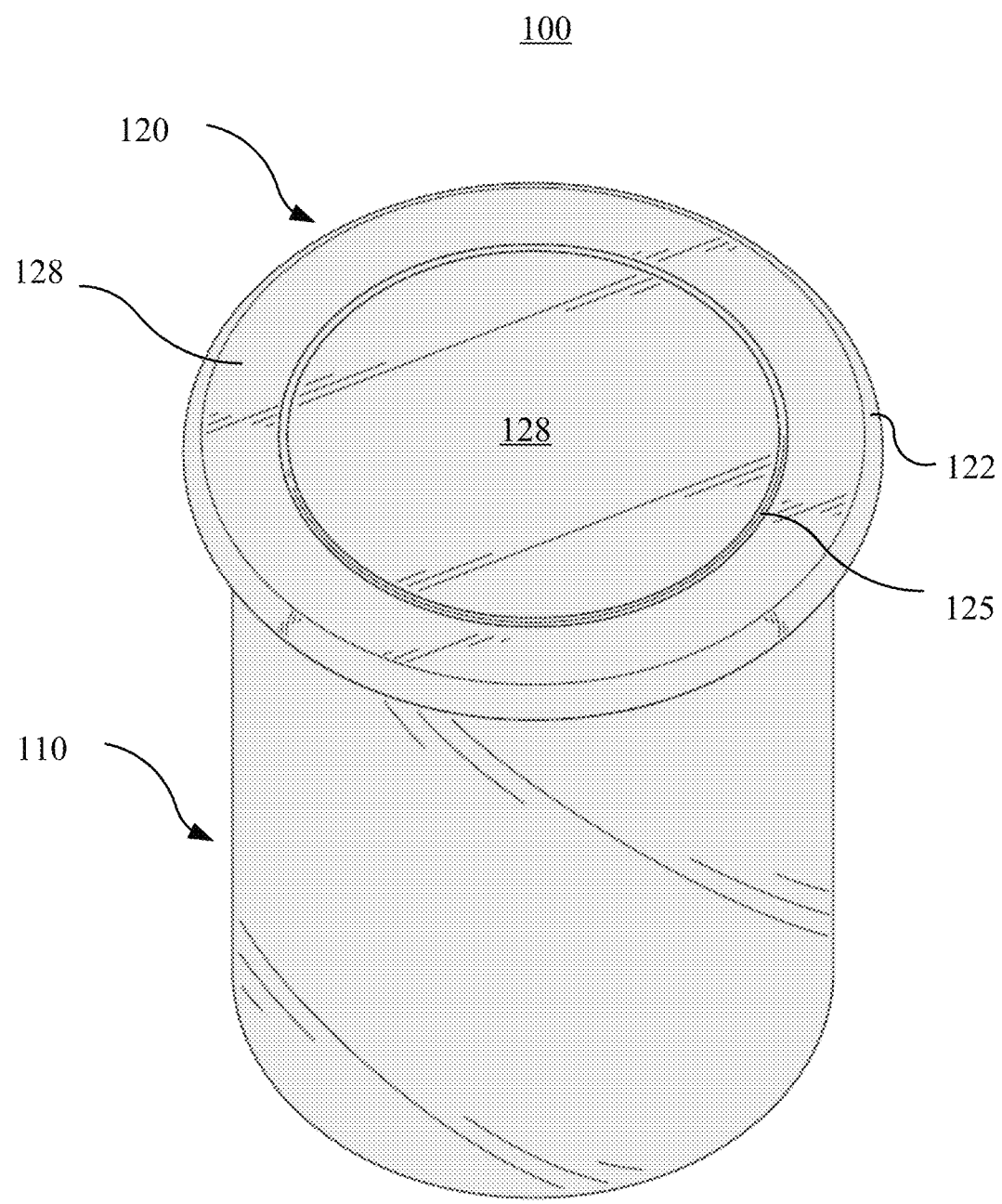
FIG. 10 is a schematic illustration of a back, bottom perspective view of a cup, according to an embodiment of the present disclosure.

FIG. 10 is a back, bottom perspective view of the cup 100. As shown in FIG. 10, the ring-shaped protrusion 125 is a protrusion from the bottom surface 128 of the base 120. The surface enclosed by the ring-shaped protrusion 125 is at the same level as the surface outside of the ring-shaped protrusion 125.

Figure 11:
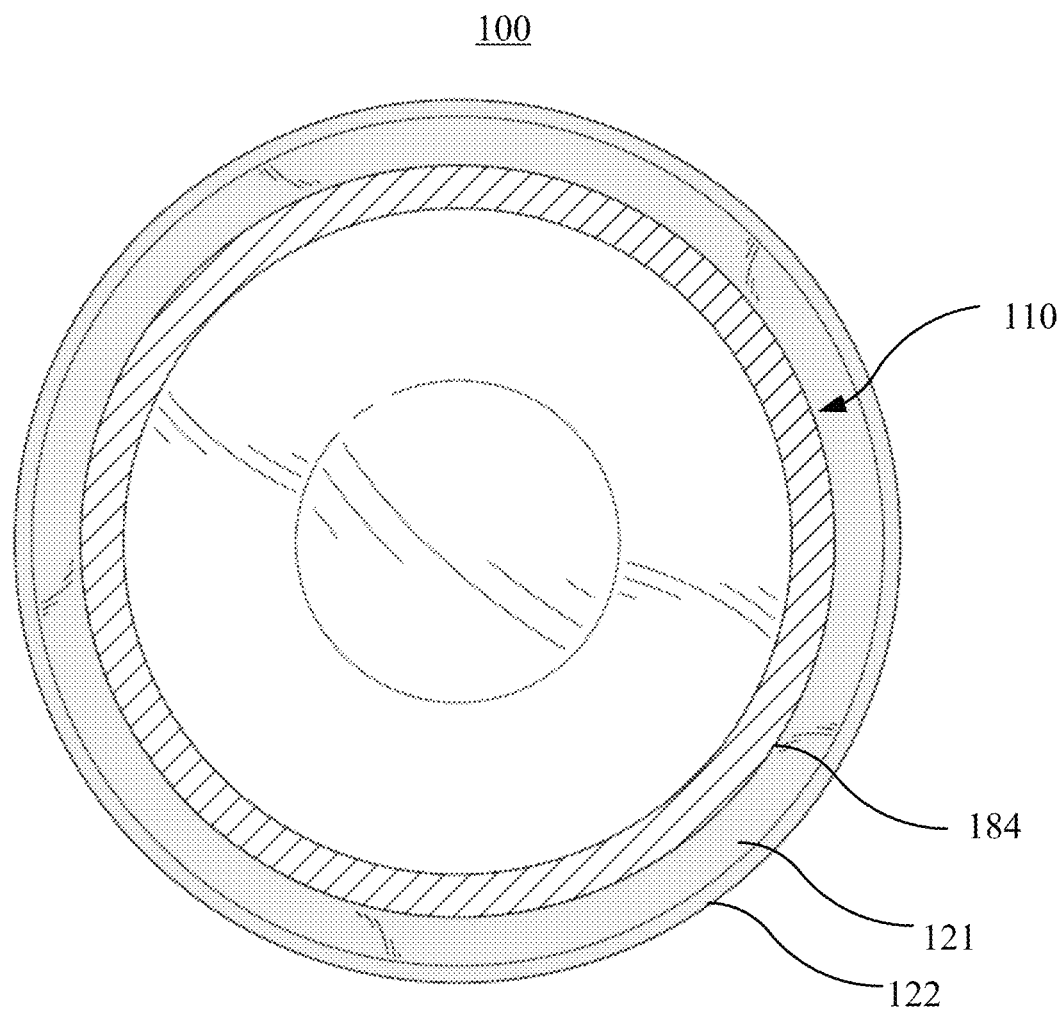
FIG. 11 is a schematic illustration of a cross-sectional view of a cup, according to an embodiment of the present disclosure.

FIG. 11 is a schematic illustration of a cross-sectional view of the cup 100 taken alone the A-A line shown in FIG. 2. The measurement scale windows, the measurement scales, the numbers, and the letters are provided on the exterior surface 184 to be substantially flush with the exterior surface 184. Thus, no indentation or recess, or protrusion is shown from the exterior surface 184 in the cross-sectional view.

FIG. 12 is a schematic illustration of anther cross-sectional view of the cup 100 taken alone the B-B line shown in FIG. 8. As shown in FIG. 12, on the interior surface 180 of the body 110, transparent measurement scale windows 131'-140' are provided at locations corresponding to the locations of the transparent measurement scale windows 131-140 provided on the exterior surface 184. In some embodiments, the sizes of the transparent measurement scale windows 131'-140' may be the same as the sizes of the corresponding transparent measurement scale windows 131-140. In some embodiments, as shown in FIG. 12, the sizes (diameters) of the transparent measurement scale windows 131'-140' may be slightly larger than the sizes of the corresponding transparent measurement scale windows 131-140. The scales, numbers, and letters provided on the front side of the exterior surface 184 of the body 110 are visible when viewed from the interior surface 180 in this cross-sectional view. As shown in the cross-sectional view, the interior surface 180 may be curved. That is, the inner diameter d5 may gradually (e.g., slightly) decrease from the top portion to the bottom portion of the cup 100. A inner bottom surface of the cup 100 is indicated by number 188.

Figure 13:
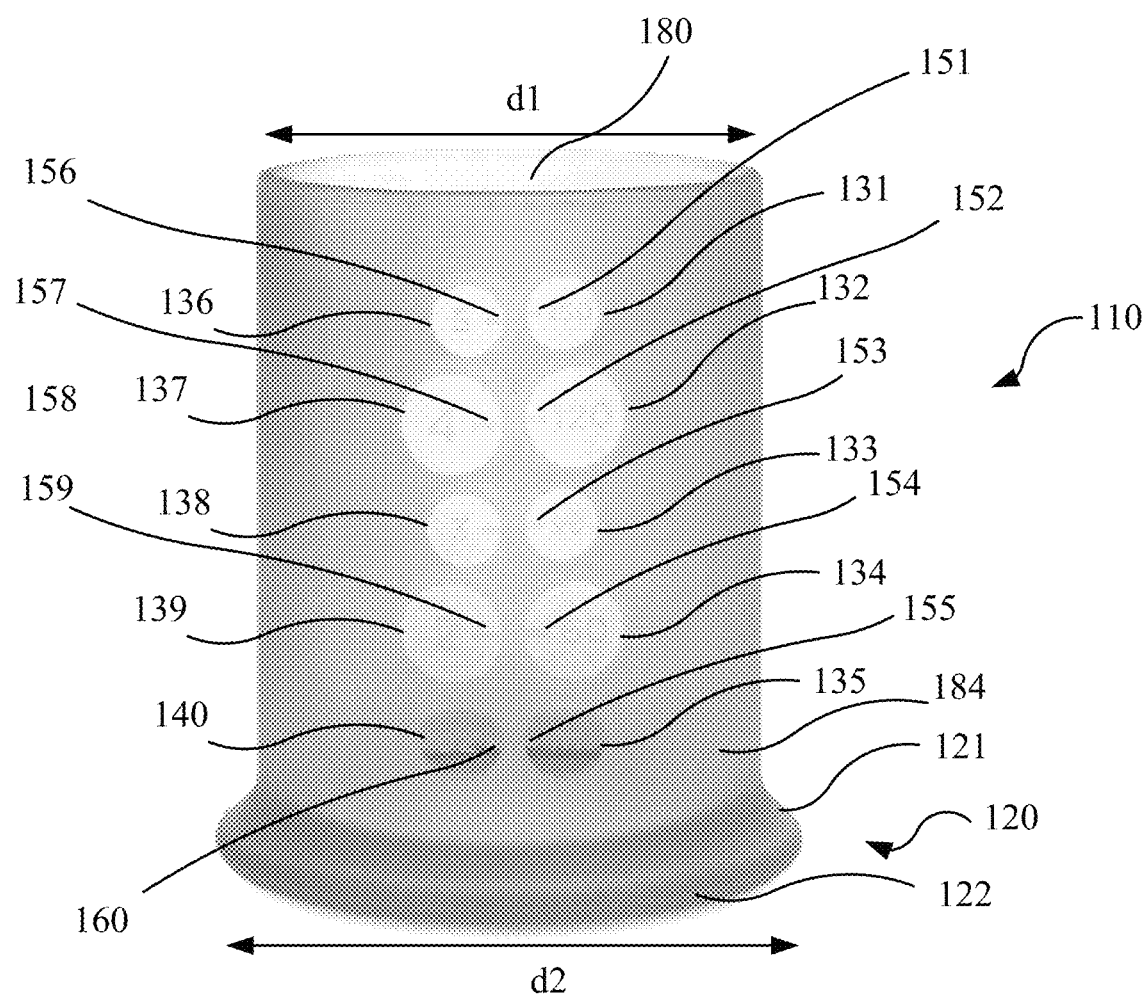
FIG. 13 is a photo showing a front perspective view of a cup, according to an embodiment of the present disclosure.
Figure 14:
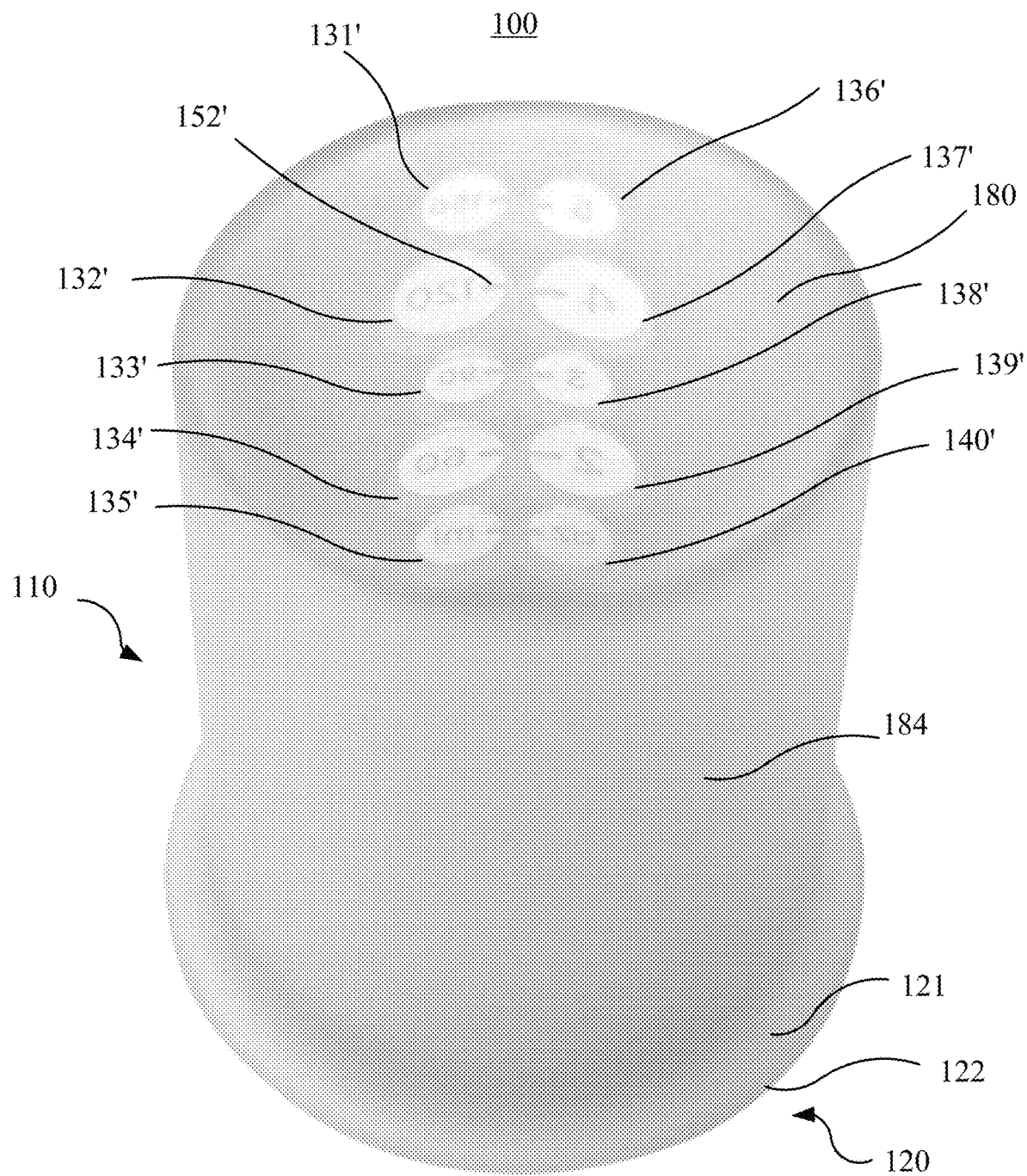
FIG. 14 is a photo showing a back perspective view of a cup, according to an embodiment of the present disclosure.

FIG. 13 is a photo showing a front perspective view of an embodiment (e.g., a product or a prototype) of the cup 100. FIG. 14 is a photo showing a back perspective view of an embodiment (e.g., a product) of the cup 100. As shown in FIG. 14, the interior surface 180 of the cup 100 is provided with the transparent measurement scale windows 131'-140' at locations corresponding to the locations of the transparent measurement scale windows 131-140 provided at the exterior surface 184 of the cup 100.

Figure 15:
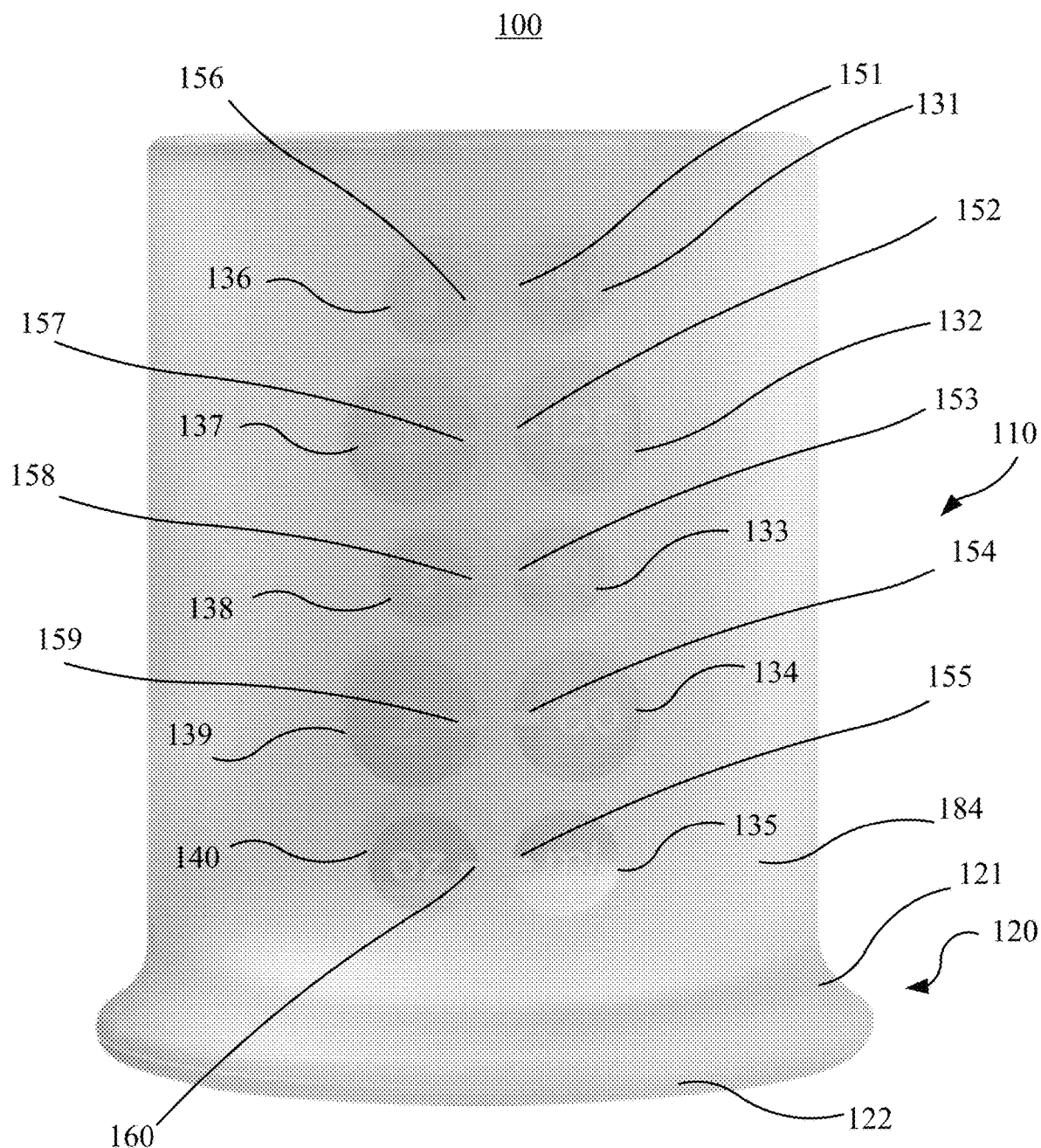
FIG. 15 is a photo showing a front view of a cup, according to an embodiment of the present disclosure.
Figure 16:
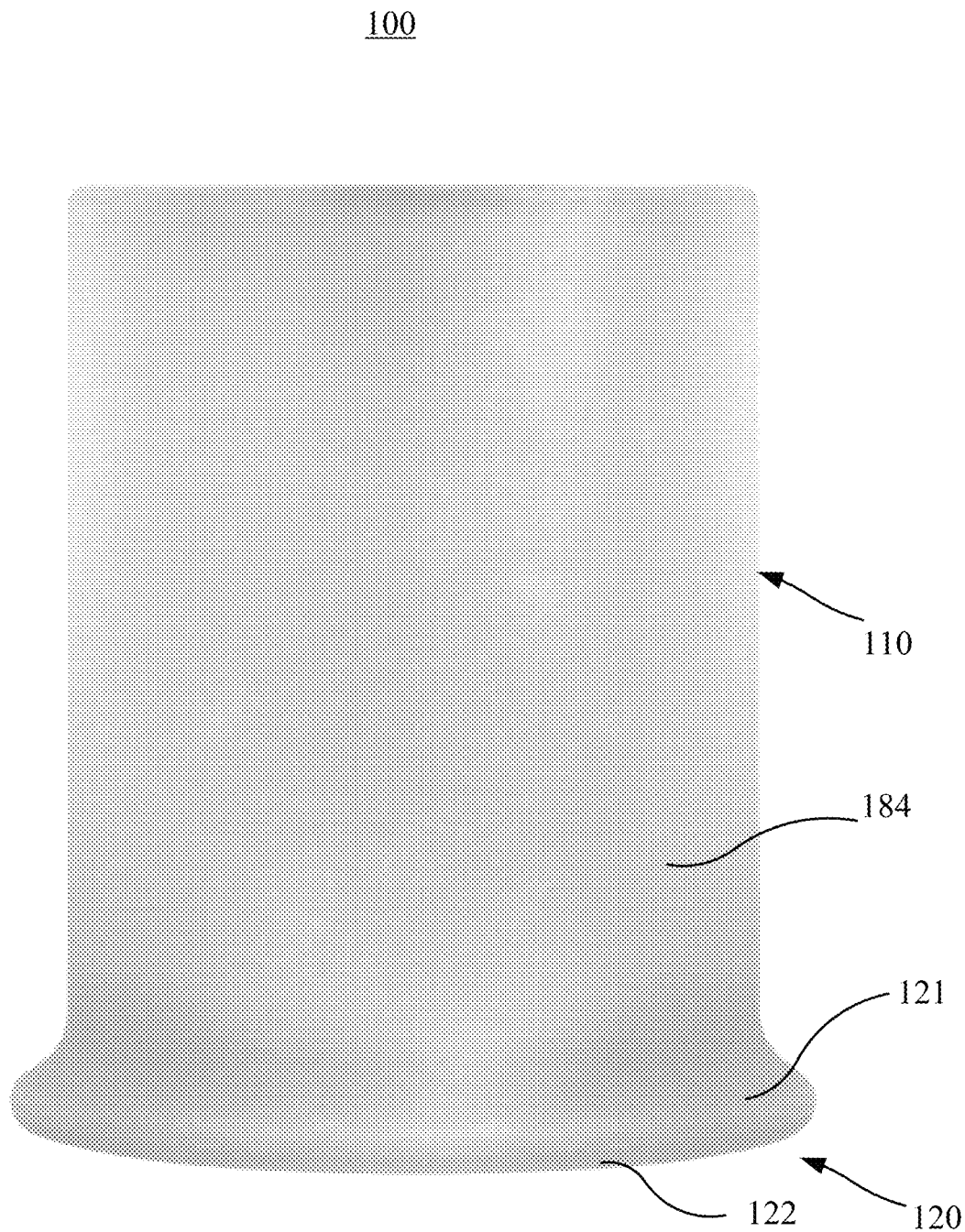
FIG. 16 is a photo showing a back view of a cup, according to an embodiment of the present disclosure.

FIG. 15 is a photo showing a front view of an embodiment (e.g., a product or a prototype) of the cup 100. FIG. 16 is a photo showing a back view of an embodiment (e.g., a product or a prototype) of the cup 100. As shown in the back view, in this embodiment, the scales, numbers, letters, and the transparent measurement scale windows are not provided at the back side of the exterior surface 184 of the cup 100.

Figure 17:
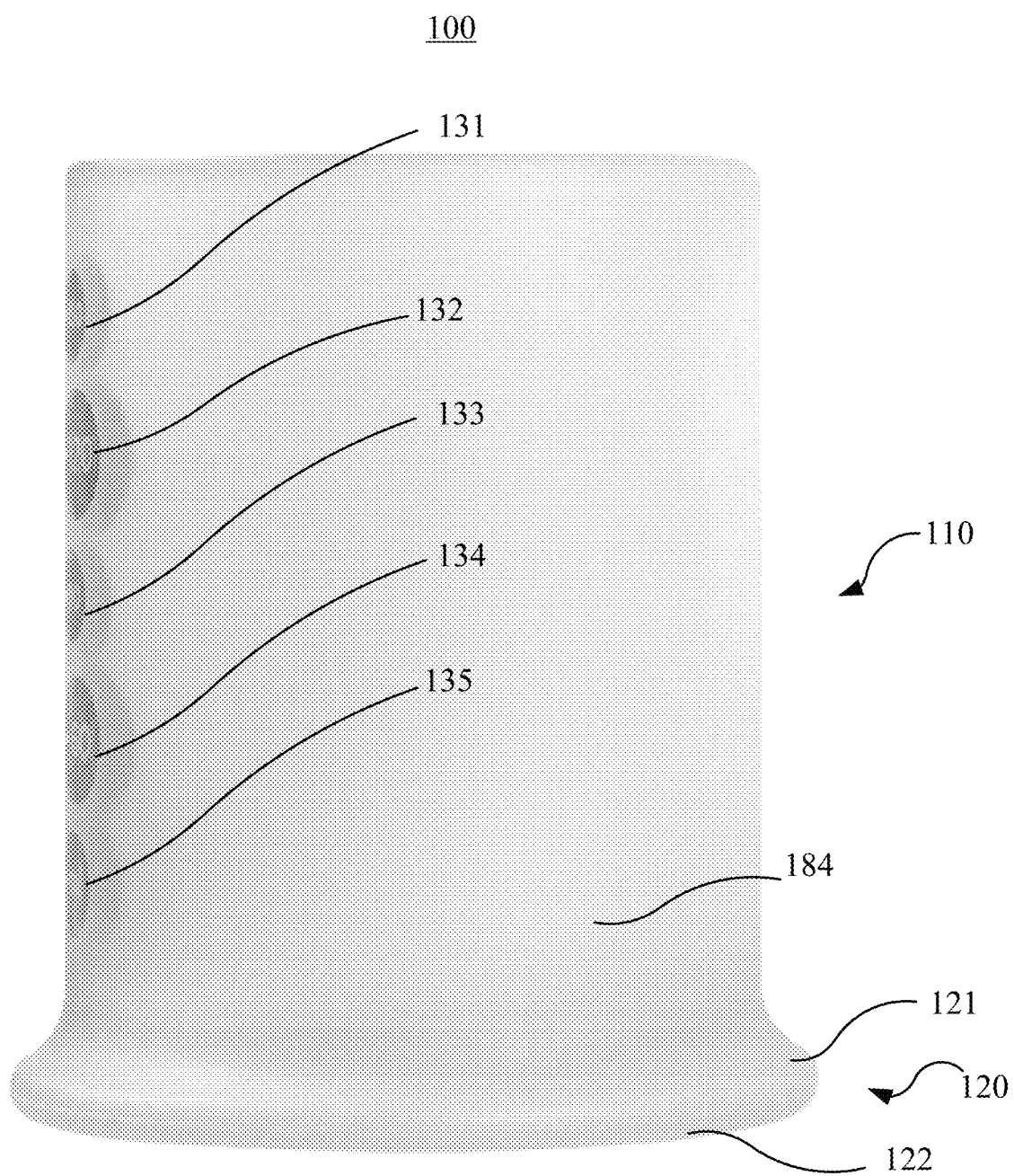
FIG. 17 is a photo showing a right side view of a cup, according to an embodiment of the present disclosure.
Figure 18:
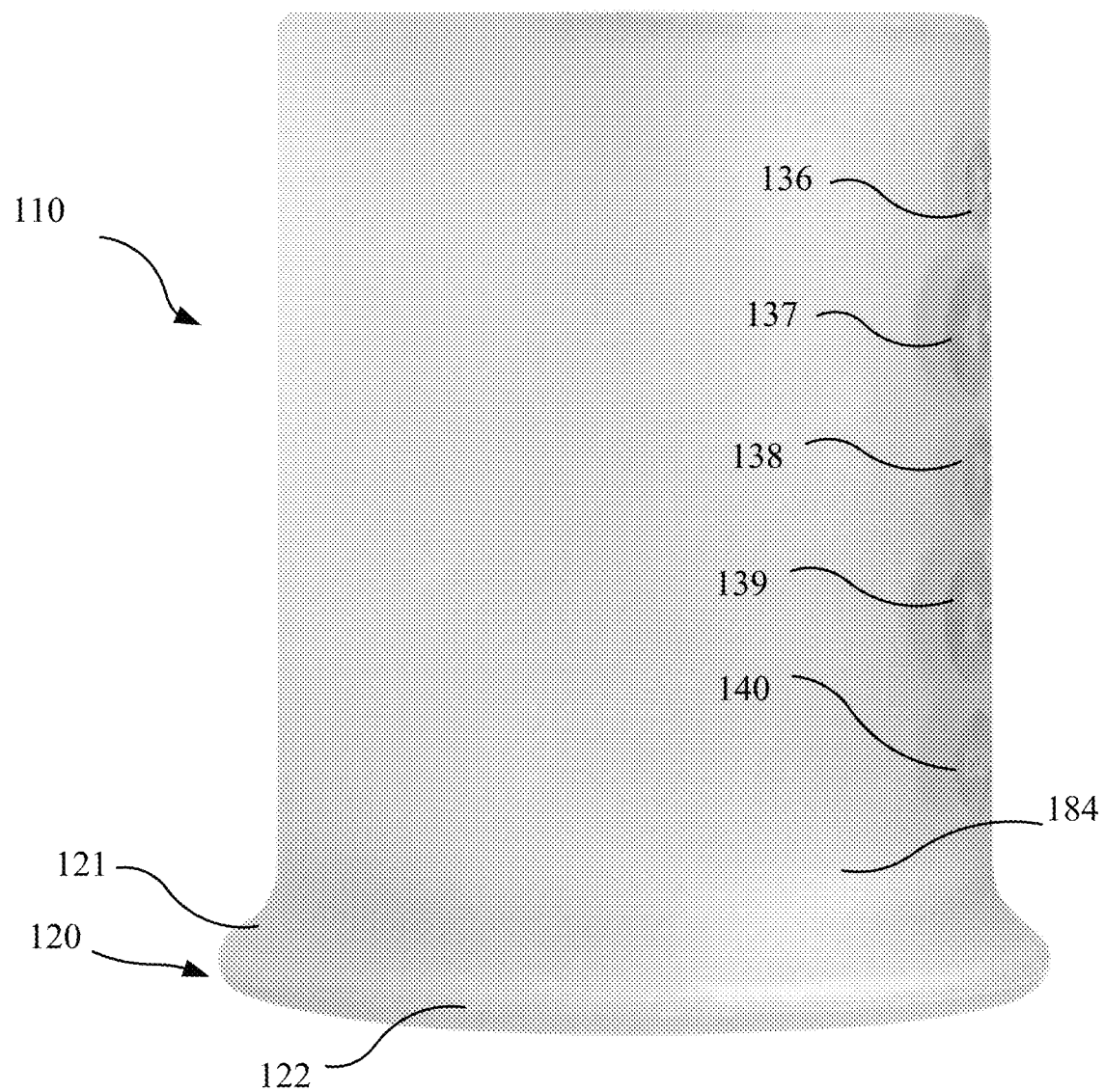
FIG. 18 is a photo showing a left side view of a cup, according to an embodiment of the present disclosure.
Figure 19:
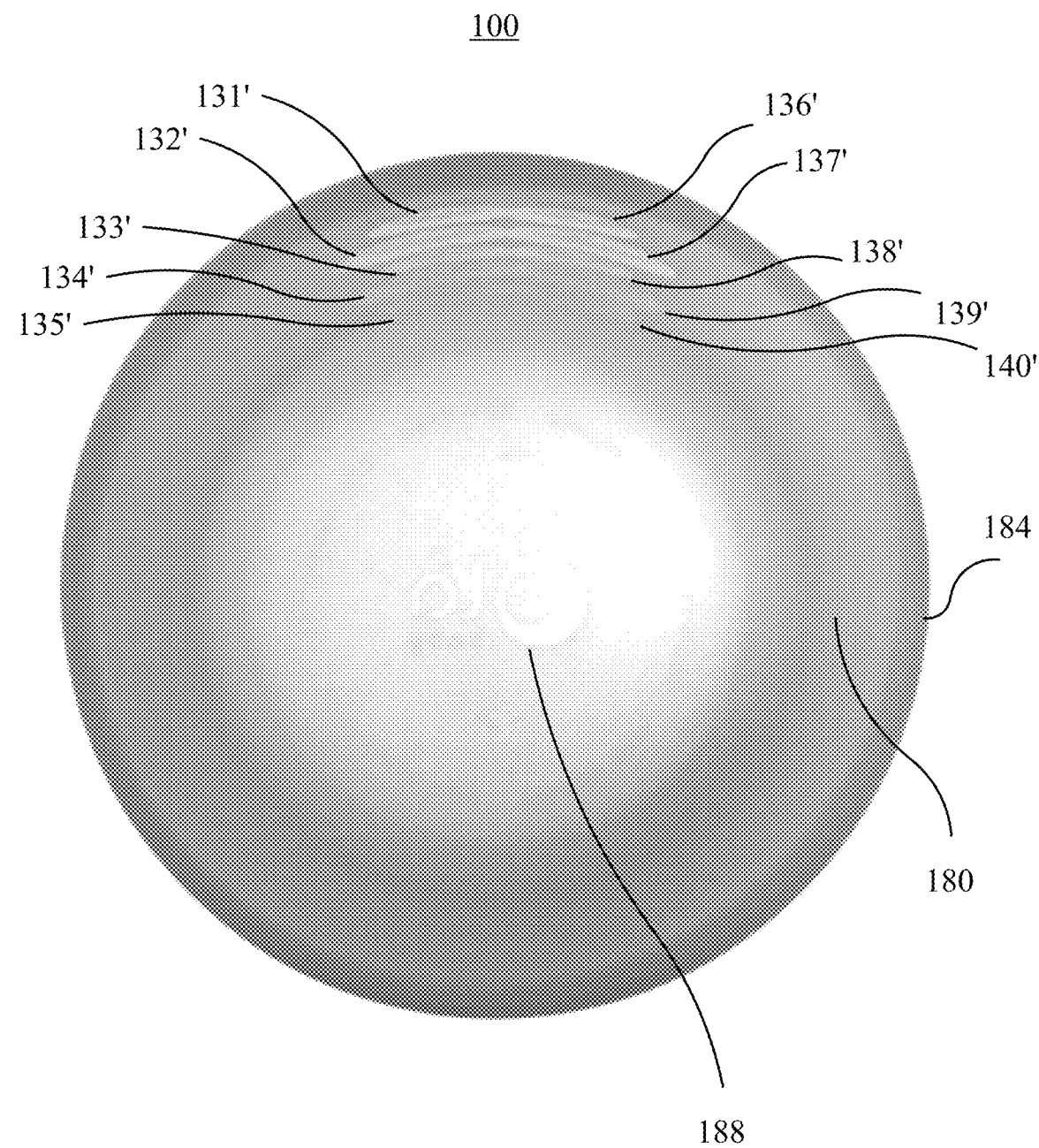
FIG. 19 is a photo showing a top view of a cup, according to an embodiment of the present disclosure.
Figure 20:
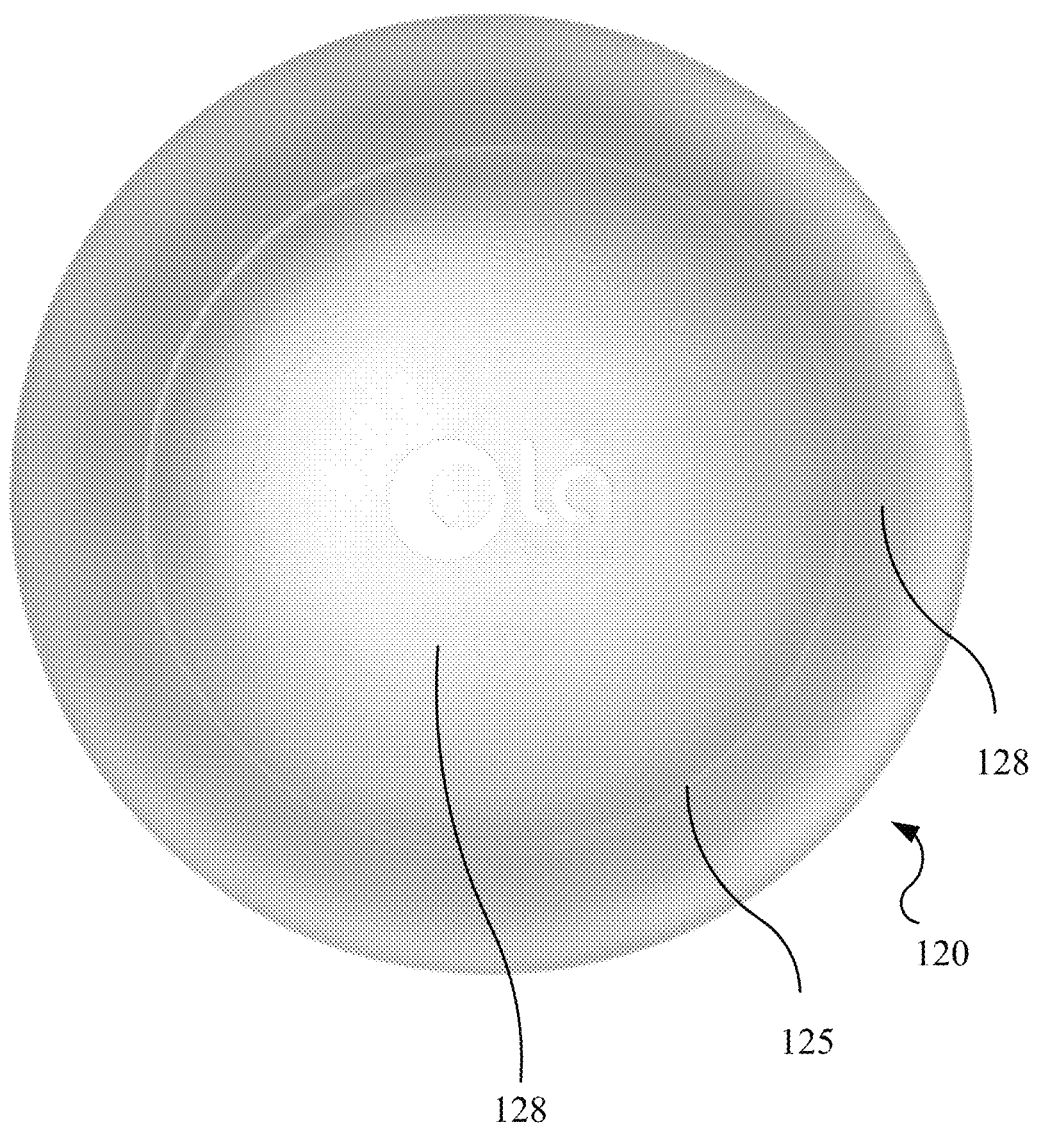
FIG. 20 is a photo showing a bottom view of a cup, according to an embodiment of the present disclosure.

FIG. 17 is a photo showing a right side view of an embodiment (e.g., a product or a prototype) the cup 100. FIG. 18 is a photo showing a left side view of an embodiment (e.g., a product or a prototype) the cup 100. FIG. 19 is a photo showing a top view of an embodiment (e.g., a product or a prototype) of the cup 100. As shown in FIG. 19, because the interior surface 180 may be curved toward the inner bottom surface 188, transparent measurement scale windows 131'-140' provided at the interior surface 180 of the cup 100 may be partially visible. FIG. 20 is a photo showing a bottom view of an embodiment (e.g., a product or a prototype) of the cup 100.

Figure 21:
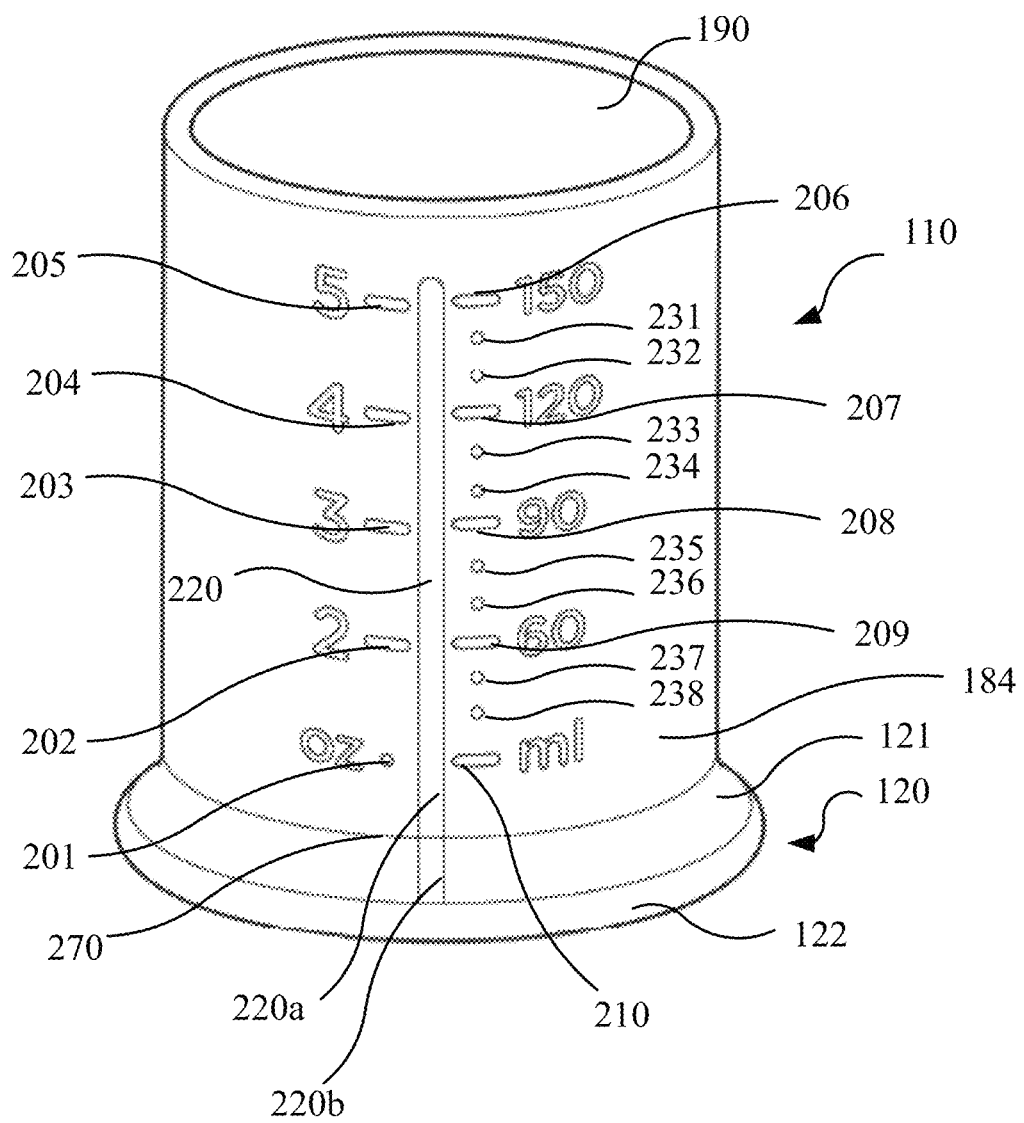
FIG. 21 is a schematic illustration of a front perspective view of a cup, according to another embodiment of the present disclosure.

FIG. 21 is a schematic illustration of a front perspective view of a cup 200, according to another embodiment of the present disclosure. The cup 200 may have substantially the same shape and structure as the cup 100, except for some differences. In FIG. 21, the same reference numbers are used to indicate elements that are the same as or similar to those included in the cup 100. Descriptions of the same or similar elements can refer to the above descriptions rendered in connection with the cup 100.

Similar to the cup 100, the cup 200 may be made of a transparent, high-purity, food-grade silicone. The exterior surface 184 of the cup 200 may be processed (e.g., through etching, sandblasting, abrasive blasting, etc.) to be translucent (e.g., frosted, matte). In some embodiments, an interior surface 190 may remain transparent. That is, the process for roughening the surface of the silicone material may not be applied to the interior surface 190 during the manufacturing process. A vertical transparent viewing window 220 may be provided at the exterior surface 184 of the cup 200. The vertical transparent viewing window 220 may include a strip shape, extending from an upper portion of the cup 200 to the base 120, in a longitudinal direction of the body 110. The vertical transparent viewing window 220 may include two portions, an upper portion 220a, which is located above a bottom circumference line 270 of the body 110, and a lower portion 220b, which is located below the bottom circumference line 270 of the body 110. It is noted that when a liquid is contained in the cup 200, the surface line of the liquid shows at the upper portion 220a above the bottom circumference line 270. The transparent lower portion 220b may not provide a viewing function. The transparent lower portion 220b of the vertical transparent viewing window 220 may exist only for aesthetic purposes. Thus, in some embodiments, the lower portion 220b may be omitted. That is, the vertical transparent viewing window 220 may not extend beyond the bottom circumference line 270 to the upper portion 121 of the base 120.

A plurality of measurement scales may be arranged in the vertical direction (or longitudinal direction of the body 110) along the vertical transparent viewing window 220. For example, in the embodiment shown in FIG. 21, two columns of scales with numbers and/or letters may be aligned on both of the left and right sides of the vertical transparent viewing window 220. A plurality of scales 201-205 may be arranged on the left side of the vertical transparent viewing window 220 to indicate the liquid level in the unit of "oz." A plurality of scales 206-210 may be arranged on the right side of the vertical transparent viewing window 220 to indicate the liquid level in the unit of "ml."

In some embodiments, the vertical transparent viewing window 220, the scales 201-210, the numbers ("5," "4," "3," "2," "150," "120," "90," "60") and the letters ("oz," and "ml"), as well as a plurality of small circular scales 231-238, may be slightly indented into the exterior surface 184 of the body 110. That is, these elements may be formed by a suitable method, such as etching, carving, engraving, etc. That is, these elements may be below the level of the exterior surface 184 of the body 110. In some embodiments, because these elements are transparent, and the interior surface 190 is transparent, when a liquid is contained in the cup 200, the surface level of the liquid may be visible through the vertical transparent viewing window, the transparent scales 201-210, and/or the transparent numbers or letters. Thus, the surface level of the liquid (or the volume of the liquid) may be readily identified by a user of the cup 200. In some embodiments, instead of having the entire interior surface 190 of the body 110 remain transparent, a portion of the interior surface 190 may be made translucent through applying a special process used to make the exterior surface 184 of the cup 200 translucent based on a transparent silicone material from which the cup 200 is made, and a portion of the interior surface 190 that is at a location corresponding to the location where the measurement indicators are located at the exterior surface 184 of the body 110 may remain transparent.

Figure 22:
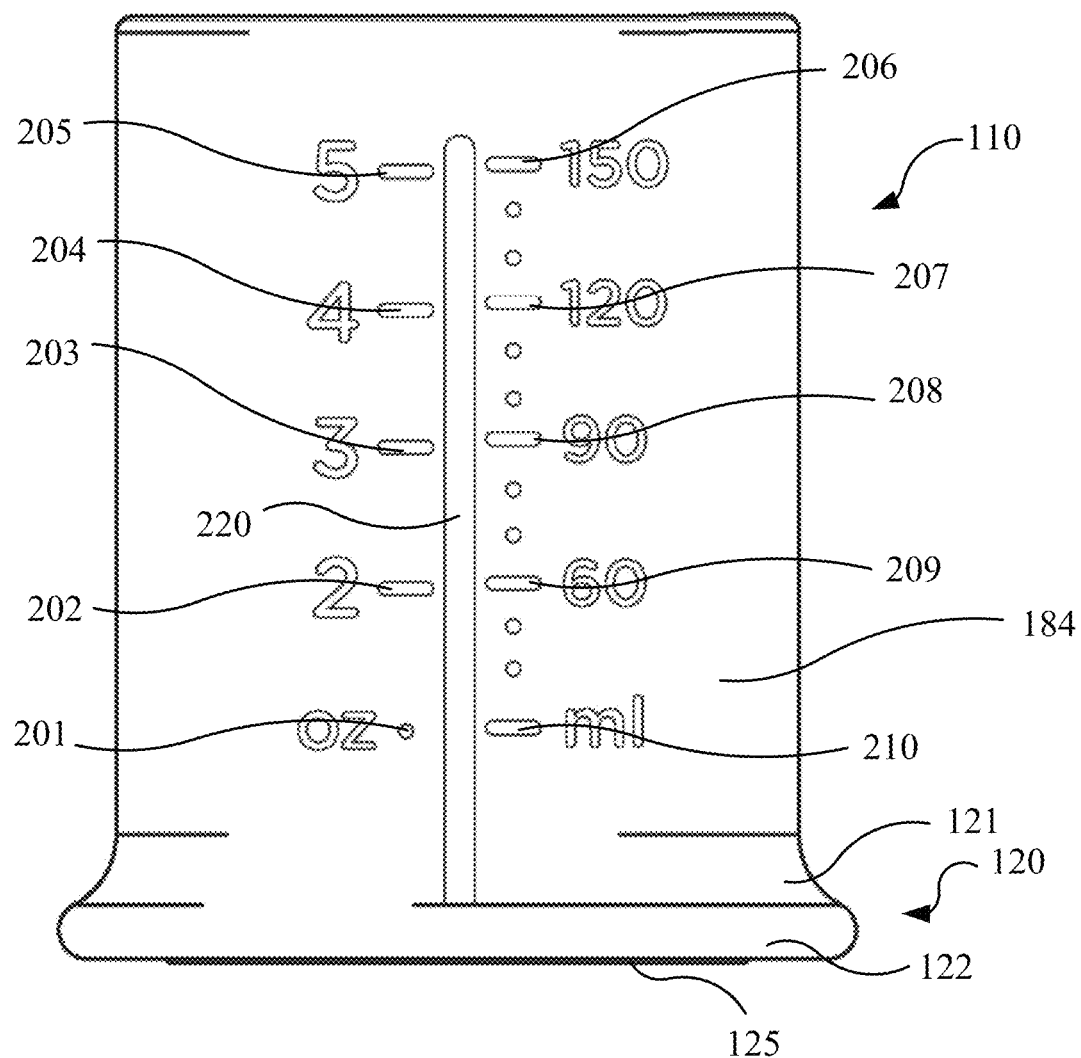
FIG. 22 is a schematic illustration of a front view of a cup, according to an embodiment of the present disclosure.
Figure 23:
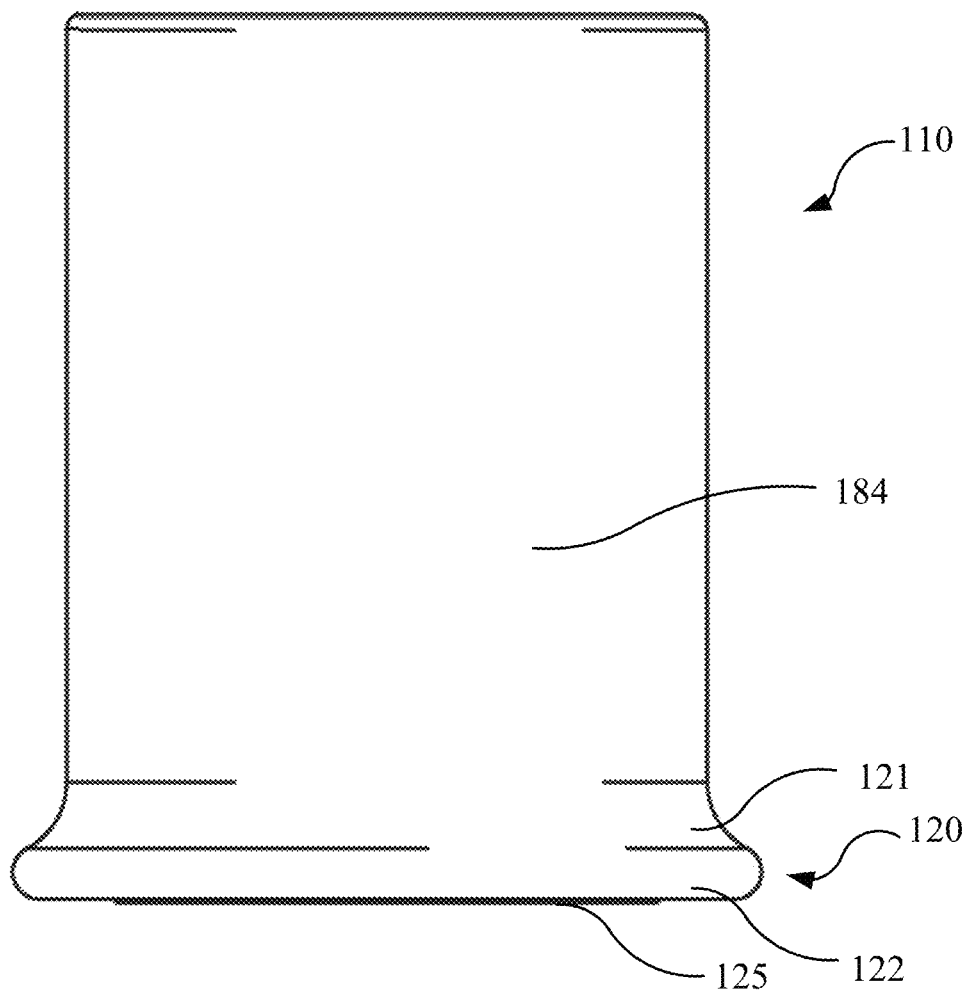
FIG. 23 is a schematic illustration of a back view of a cup, according to an embodiment of the present disclosure.

FIG. 22 is a schematic illustration of a front view of the cup 200. FIG. 23 is a schematic illustration of a back view of the cup 200. As shown in FIG. 22, in some embodiments, the vertical transparent viewing window 220, the scales 201-210, the numbers ("5," "4," "3," "2," "150," "120," "90," "60") and the letters ("oz," and "ml"), as well as a plurality of small circular scales 231-238, are not provided at the back side of the exterior surface 184 of the cup 200. In some embodiments, the same vertical transparent viewing window 220, the scales 201-210, the numbers ("5," "4," "3," "2," "150," "120," "90," "60") and the letters ("oz," and "ml"), as provided at the front side of the exterior surface 184 of the cup 200, may be provided at the back side of the exterior surface 184. In some embodiments, the same measurement indicators may also be provided on the left side of the exterior surface 184 and the right side of the exterior surface 184. In other words, the same measurement indicators may be provided at multiple sides of the exterior surface 184 of the cup 200.

Figure 24:
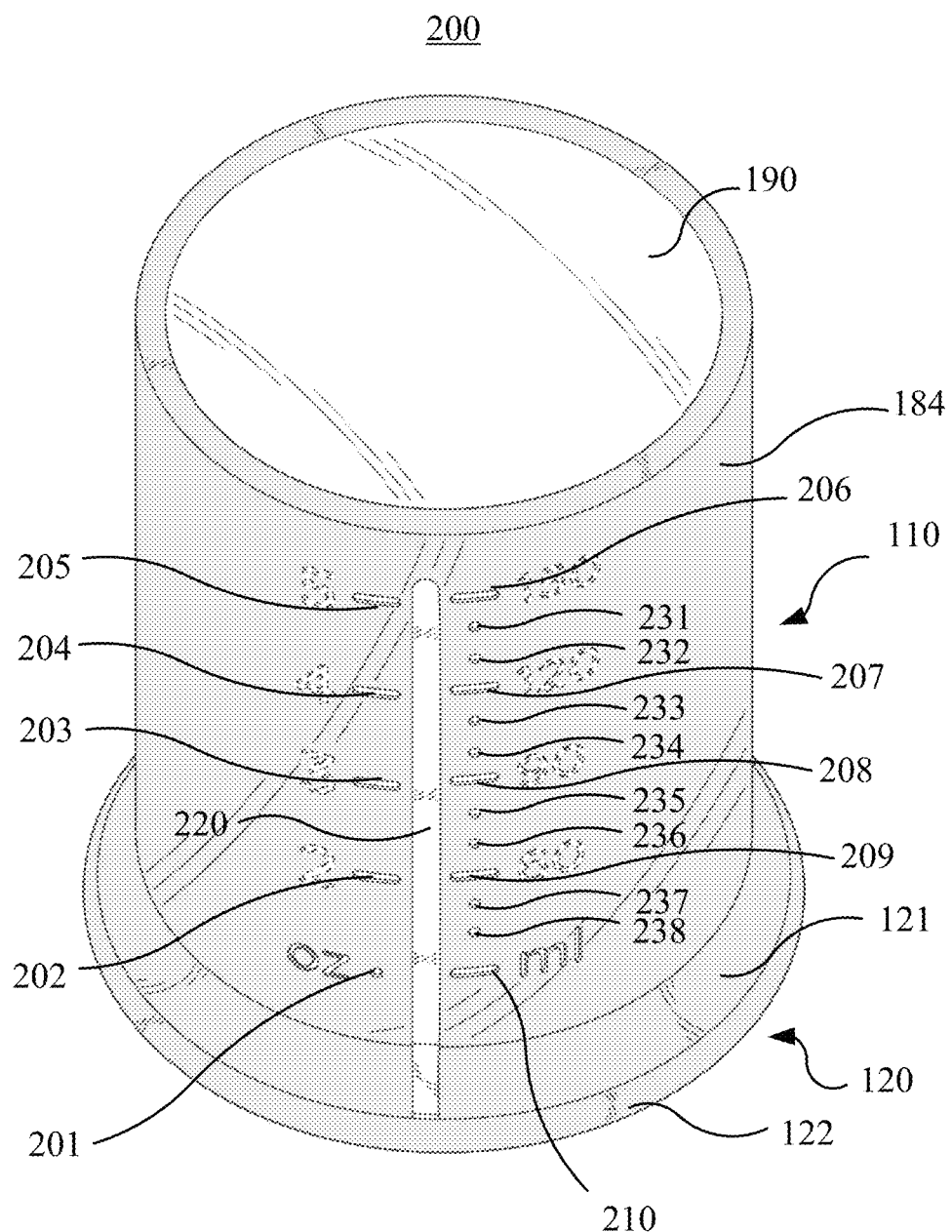
FIG. 24 is a schematic illustration of a front perspective view of a cup, according to an embodiment of the present disclosure.
Figure 25:
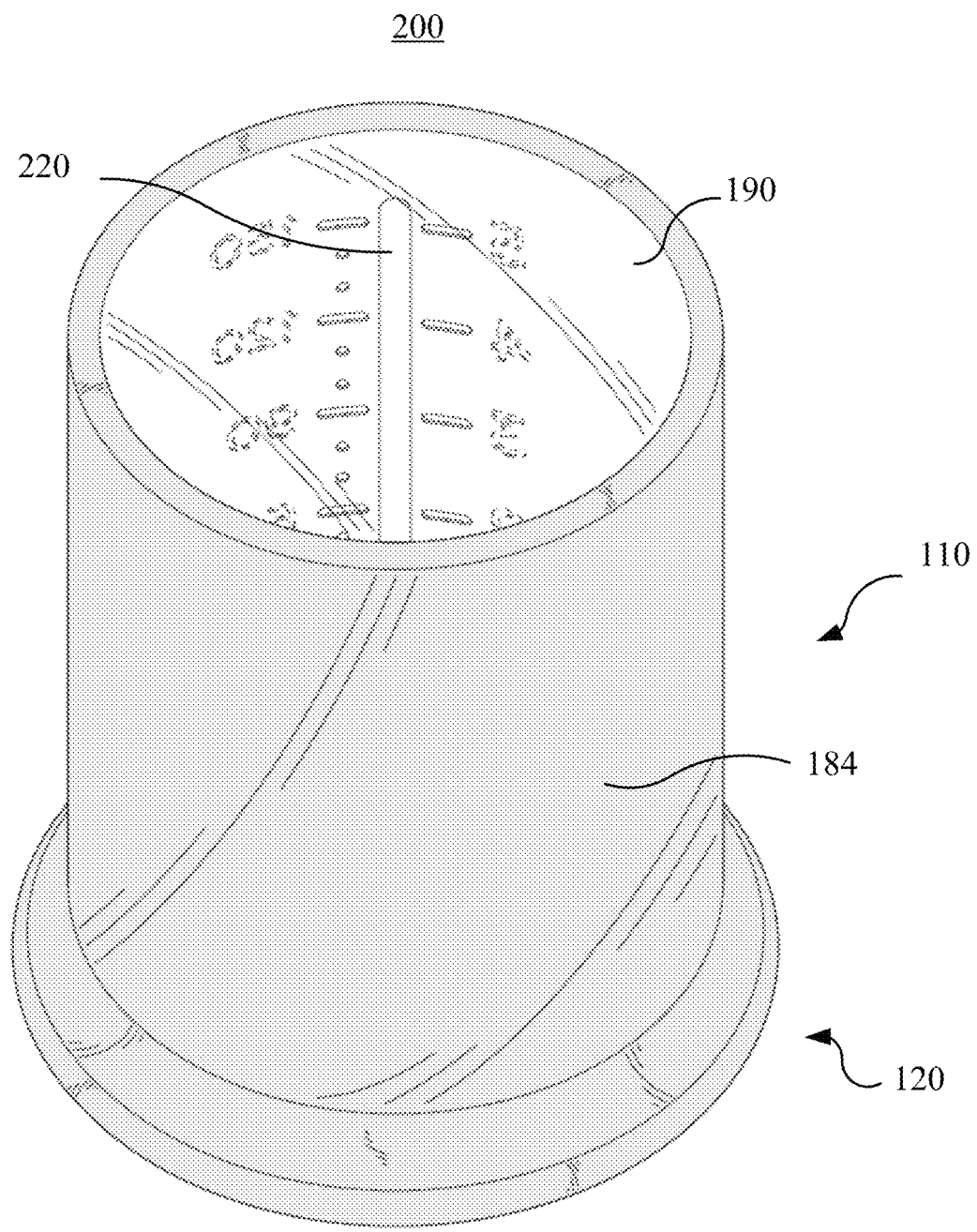
FIG. 25 is a schematic illustration of a back perspective view of a cup, according to an embodiment of the present disclosure.

FIG. 24 is a schematic illustration of a front perspective view of the cup 200. FIG. 24 is similar to FIG. 21. In FIG. 24, shades are added to the exterior surface 184 of the cup 200 to indicate translucency. The interior surface 190 is transparent. FIG. 25 is a schematic illustration of a back perspective view of the cup 200. In FIG. 25, shades are added to the exterior surface 184 of the cup 200 to indicate translucency. As shown in FIG. 25, the interior surface 190 may be transparent and the measurement indicators (e.g., the vertical transparent viewing window 220) located at the front side exterior surface of the body 110 may be visible through the transparent interior surface 190. It is noted that no measurement indicators (similar to those provided at the exterior surface 184) are provided on the interior surface 190.

Figure 26:
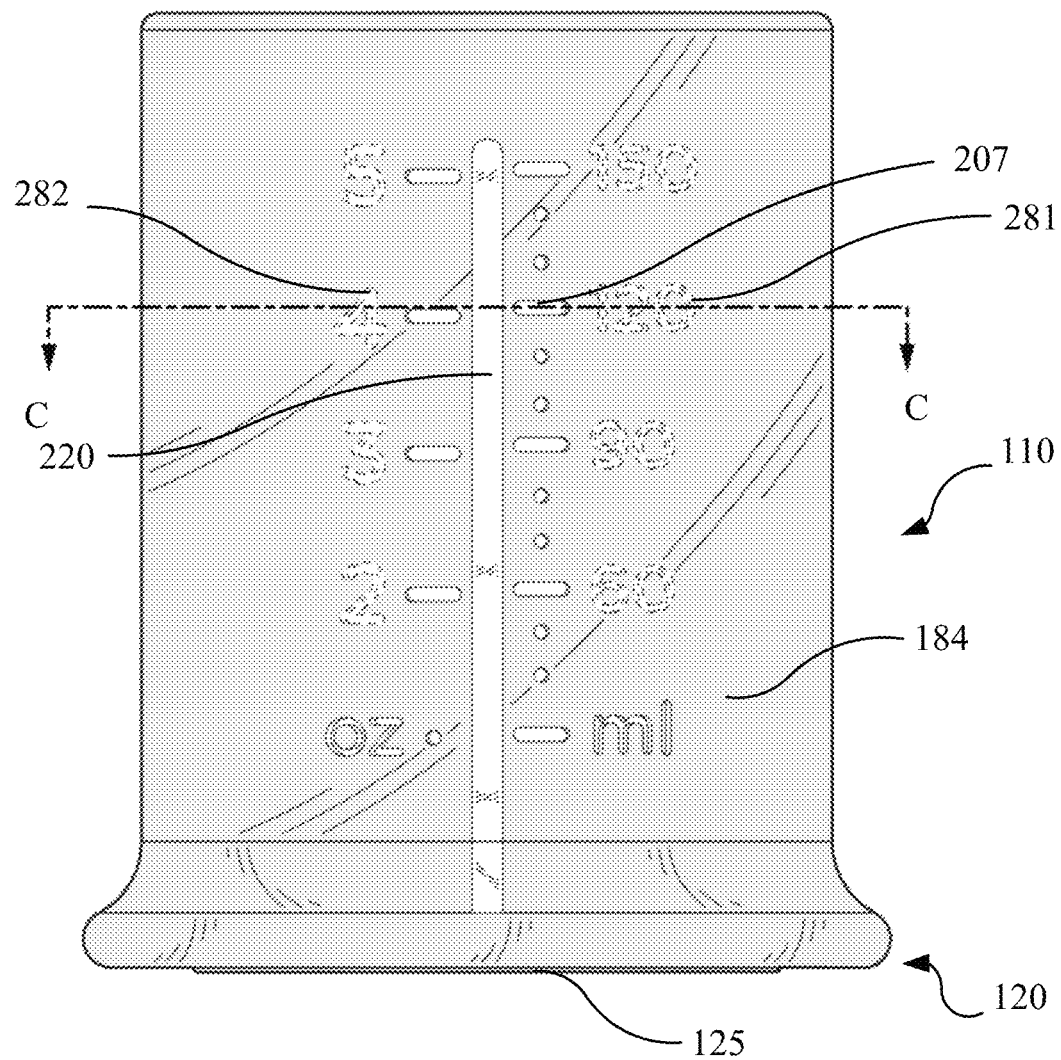
FIG. 26 is a schematic illustration of a front view of a cup, according to an embodiment of the present disclosure.
Figure 27:
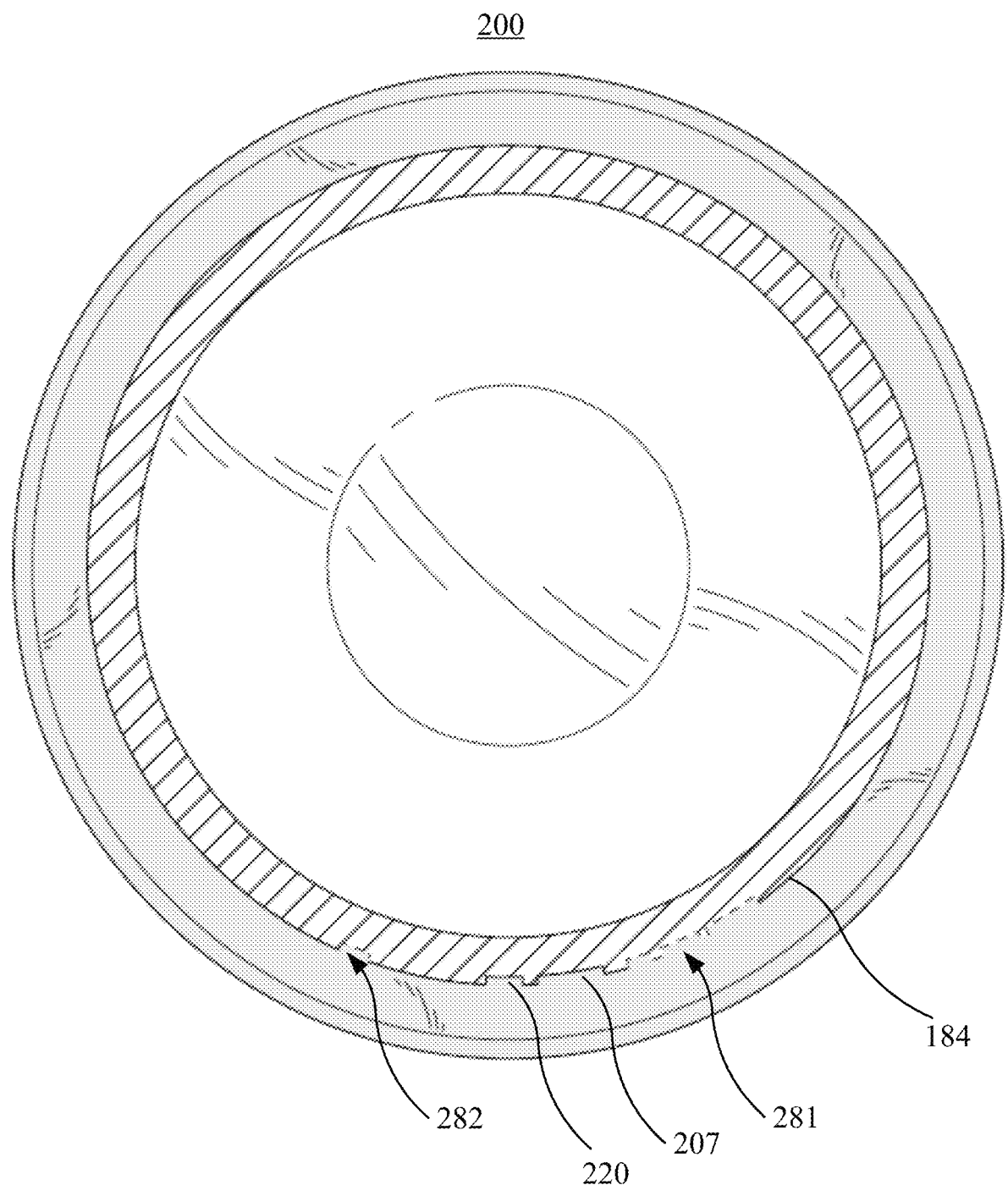
FIG. 27 is a schematic illustration of a cross-sectional view of a cup, according to an embodiment of the present disclosure.

FIG. 26 is a schematic illustration of a front view of the cup 200. FIG. 26 is similar to FIG. 22. In FIG. 26, shades are added to the exterior surface of the cup 200 to indicate translucency. FIG. 27 is a schematic illustration of a cross-sectional view of the cup 200 taken alone the C-C line shown in FIG. 26. In FIG. 27, reference numbers 281 and 282 show the location of the numbers "4" and "120" (also shown in FIG. 26). As shown in FIG. 27, the vertical transparent viewing window 220, the measurement scale 207, and the numbers (as indicated by 281 and 282) are recessed or indented from the exterior surface 184. That is, these measurement indicators are lower than the exterior surface 184.

Figure 28:
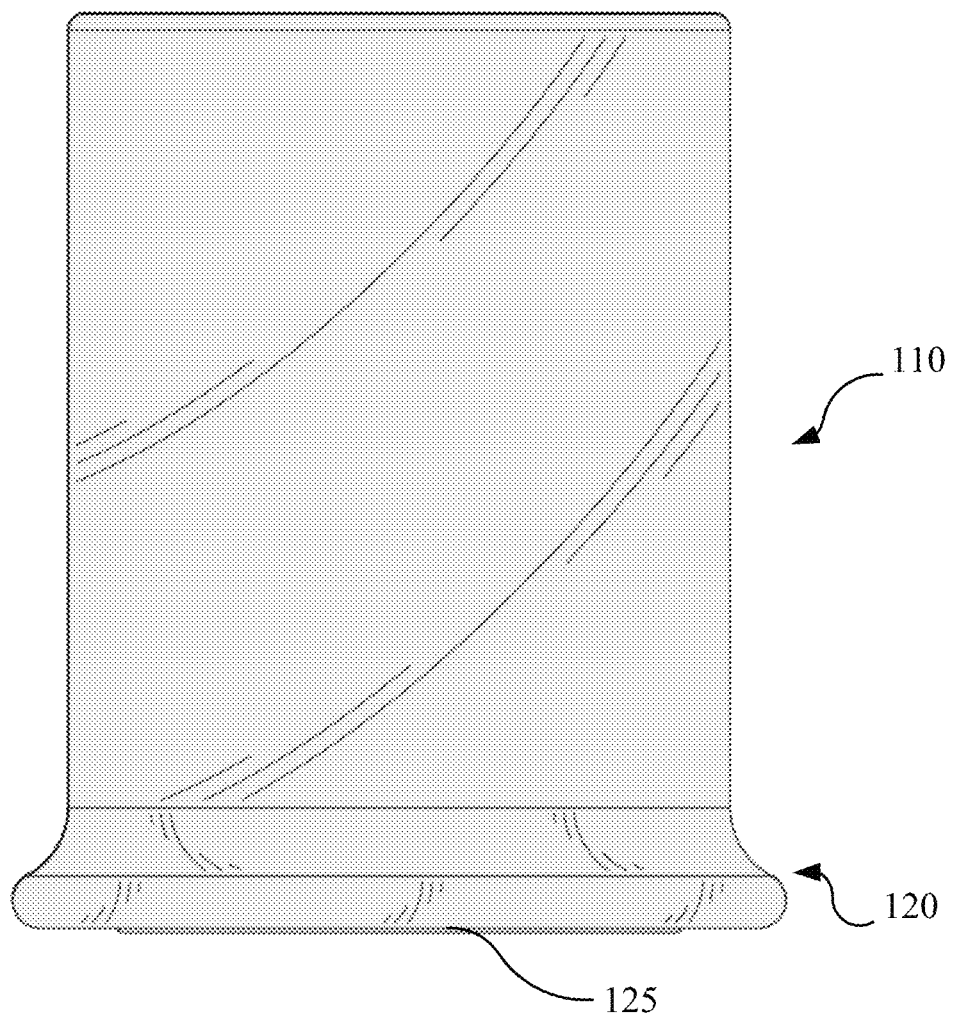
FIG. 28 is a schematic illustration of a back view of a cup, according to an embodiment of the present disclosure.
Figure 29:
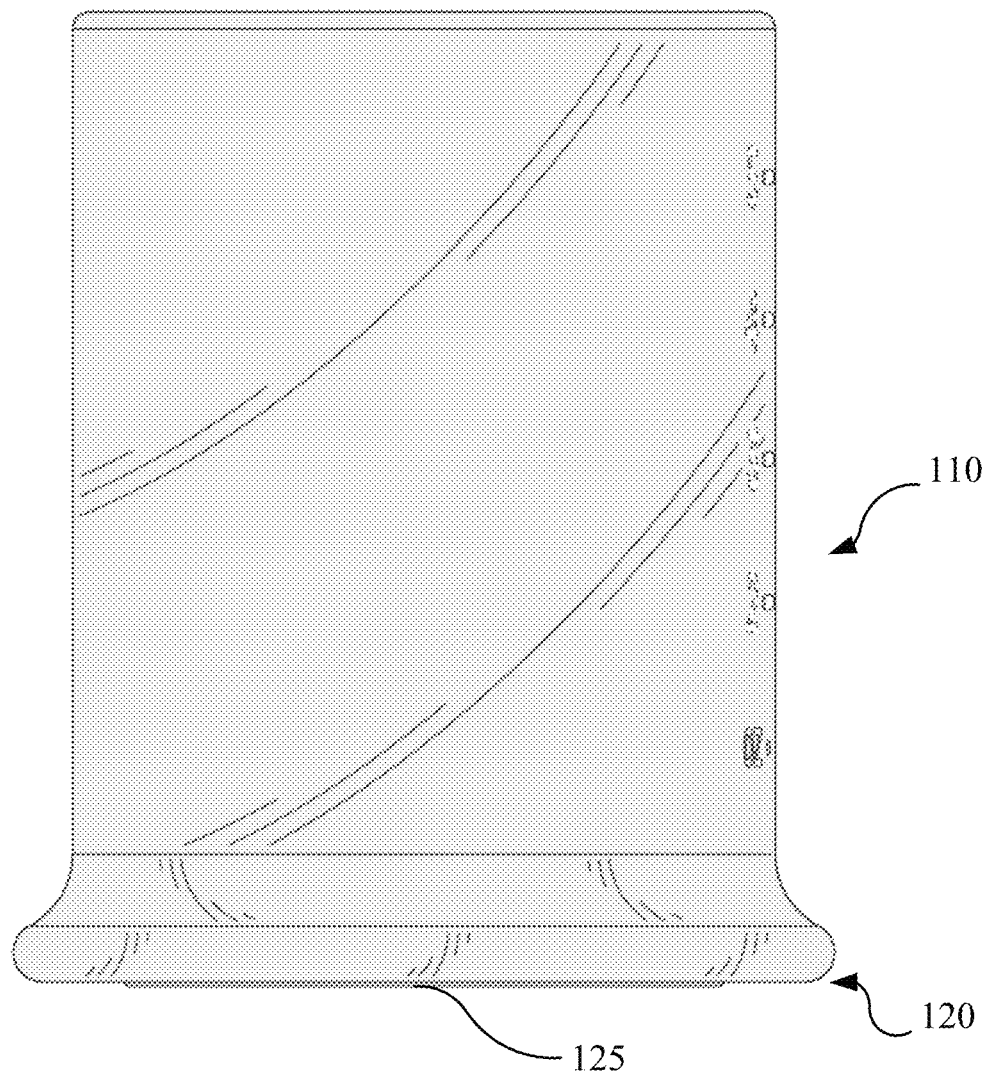
FIG. 29 is a schematic illustration of a left side view of a cup, according to an embodiment of the present disclosure.
Figure 30:
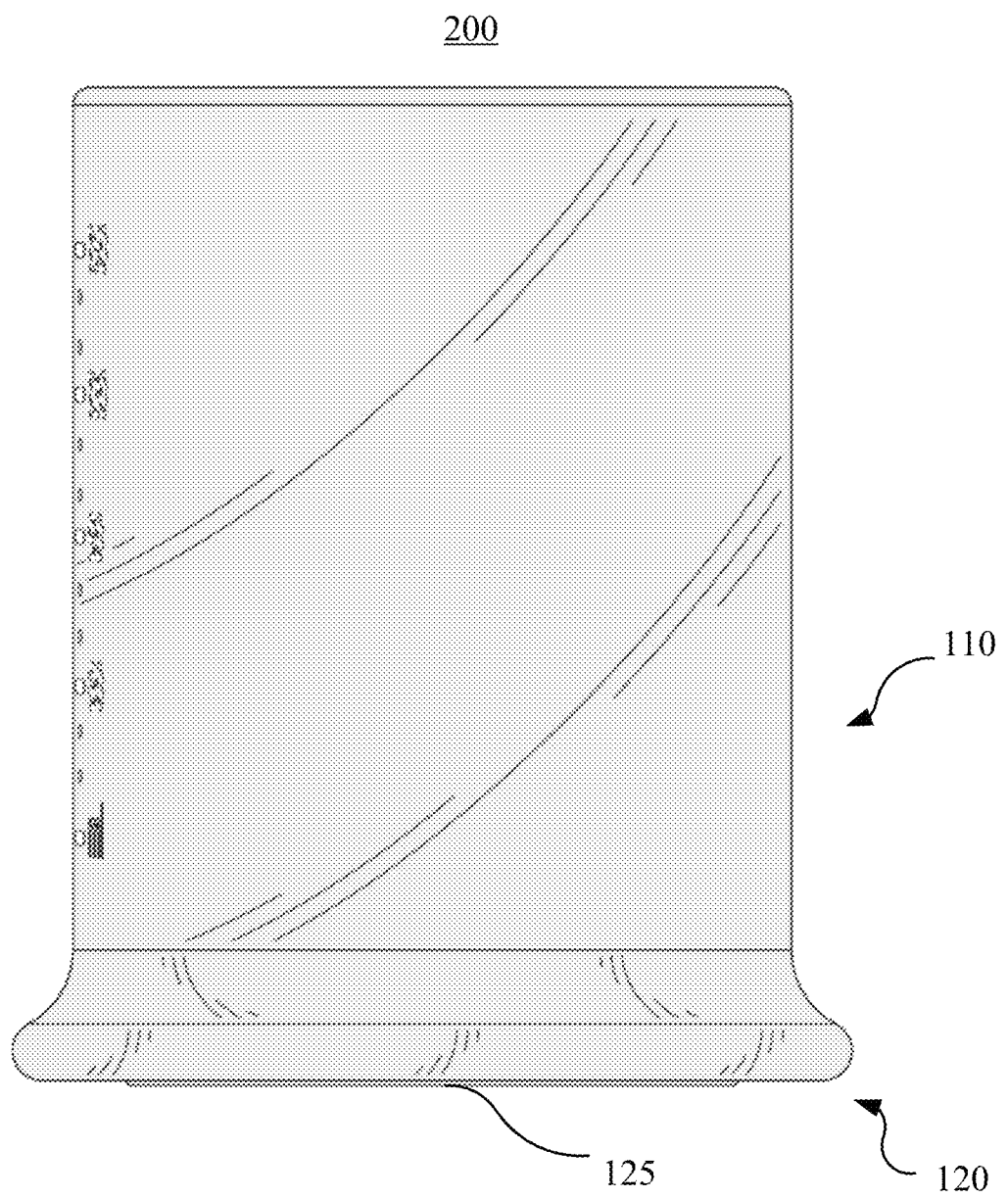
FIG. 30 is a schematic illustration of a right side view of a cup, according to an embodiment of the present disclosure.
Figure 31:
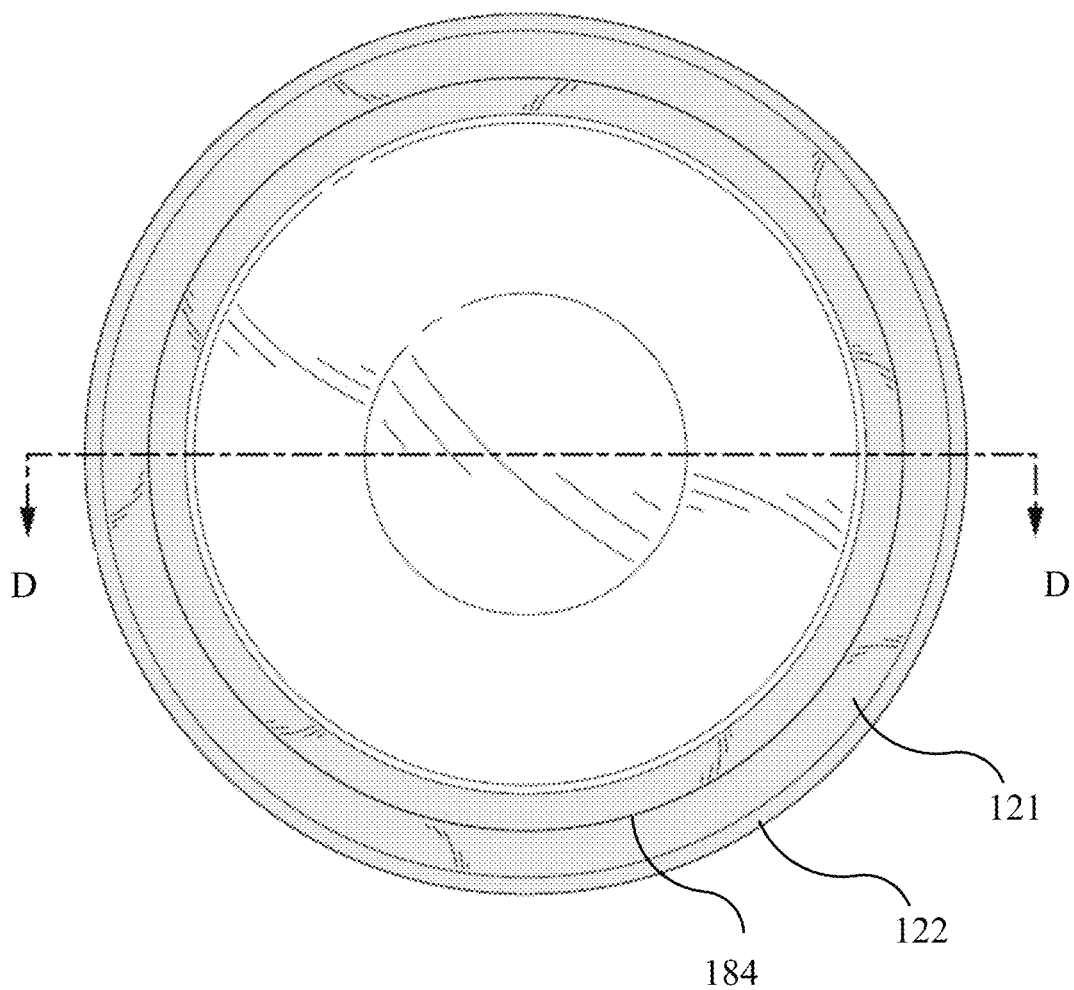
FIG. 31 is a schematic illustration of a top view of a cup, according to an embodiment of the present disclosure.
Figure 32:
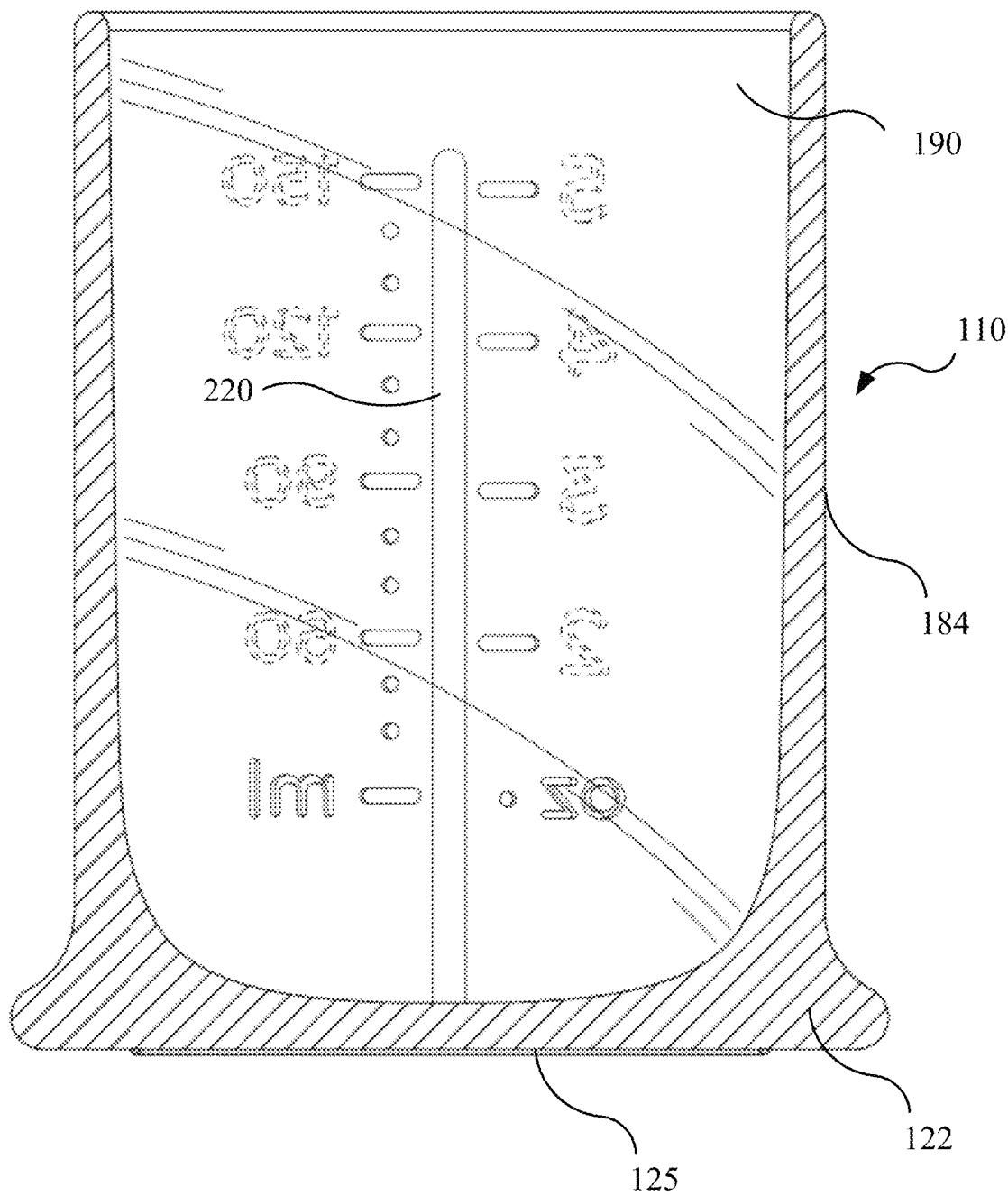
FIG. 32 is a schematic illustration of a cross-sectional view of a cup, according to an embodiment of the present disclosure.

FIG. 28 is a schematic illustration of a back view of the cup 200. FIG. 28 is similar to FIG. 23. In FIG. 28, shades are added to the exterior surface of the cup 200 to indicate translucency. FIG. 29 is a schematic illustration of a left side view of the cup 200. In FIG. 29, shades are added to the exterior surface of the cup 200 to indicate translucency. FIG. 30 is a schematic illustration of a right side view of the cup 200. In FIG. 30, shades are added to the exterior surface of the cup 200 to indicate translucency. FIG. 31 is a schematic illustration of a top view of the cup 200. FIG. 32 is a schematic illustration of a cross-sectional view taken alone the D-D line in FIG. 31. As shown in FIG. 32, because the interior surface 190 is transparent, the measurement indicators (e.g., the vertical transparent viewing window 220 and the scales, numbers, letters) may be visible when viewed from the interior surface 190. The bottom view of the cup 200 may be similar to the bottom view of the cup 100 shown in FIG. 9.

Figure 33:
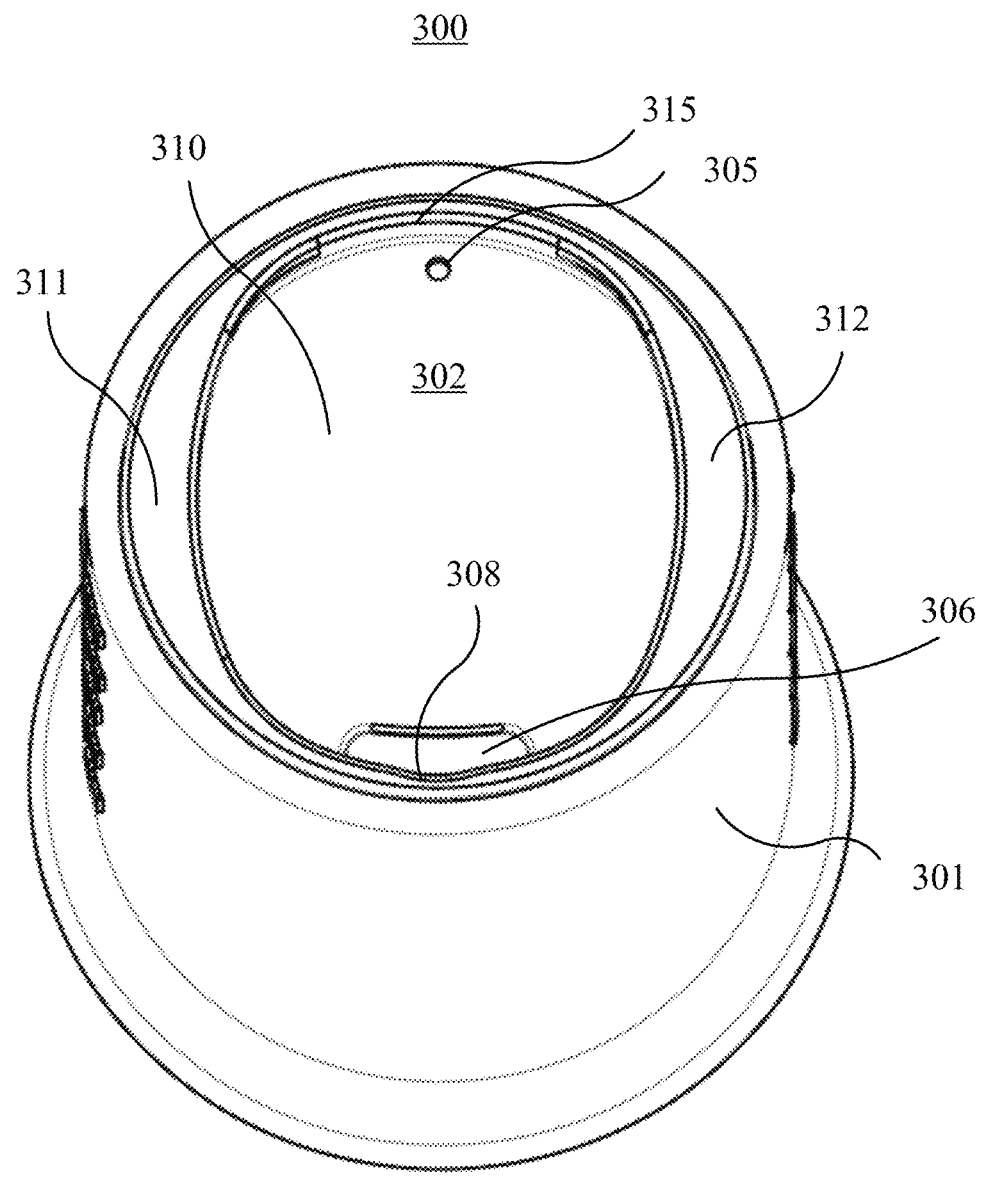
FIG. 33 is a schematic illustration of a perspective view of a drinking cup assembly, according to an embodiment of the present disclosure.

FIG. 33 is a schematic illustration of a perspective view of a drinking cup assembly 300. The drinking cup assembly 300 may include a cup 301 and a lid 302. The cup 301 may be any embodiment of the cup disclosed herein, e.g., cup 100 or cup 200. FIG. 33 shows that the lid 302 is assembled with the cup 301. The lid 302 may be assembled with the cup 301 at any orientation in the horizontal plane. That is, the lid 302 may be rotated to any angle horizontally from the position shown in FIG. 33, and still be assembled with the cup 301. The lid 302 may close or seal the cup 301. The lid 302 may include a substantially circular or round shape configured to fit with the opening of the cup 301. The lid 302 may be coupled with the cup 301 through press-fitting. The lid 302 and the cup 301 may both be made of silicone or a material including silicone. The lid 302 may include a substantially cylindrical shape, including a round wall 315, and a center plate 310.

As shown in FIG. 33, the lid 302 may include a first hole 305 and a second hole 306 disposed at opposing sides of the center plate 310. The first hole 305 may be smaller than the second hole 306. The first hole 305 may have a round or circular shape, or any other suitable shape. The first hole 305 may allow air to enter into the cup 301 during a drinking process, thereby facilitating the liquid flow. The second hole 306 may be a drinking hole. The second hole 306 may include a substantially obround shape. The size of the second hole 306 may be configured to be any suitable size for fitting with different users. For example, the size of the second hole 306 may be configured to be smaller for young children than for adults. The wall 315 may include a substantially round shape. At the portion of the wall 315 adjacent the second hole 306, the wall 315 may include a portion 308 that is recessed outwardly to facilitate the drinking.

The lid 302 may include a first flange 311 and a second flange 312 disposed on opposite sides of the wall 315 and extending from the wall 315 inwardly toward the center of the lid 302. The first flange 311 and the second flange 312 may be configured for a user to grab to separate the lid 302 from the cup 301. The first flange 311 and the second flange 312 may have a crescent shape, and may be symmetrically disposed on the left and right sides of a diameter connecting the first hole 305 and the second hole 306. The first flange 311 and the second flange 312 may have the same size.

Figure 34:
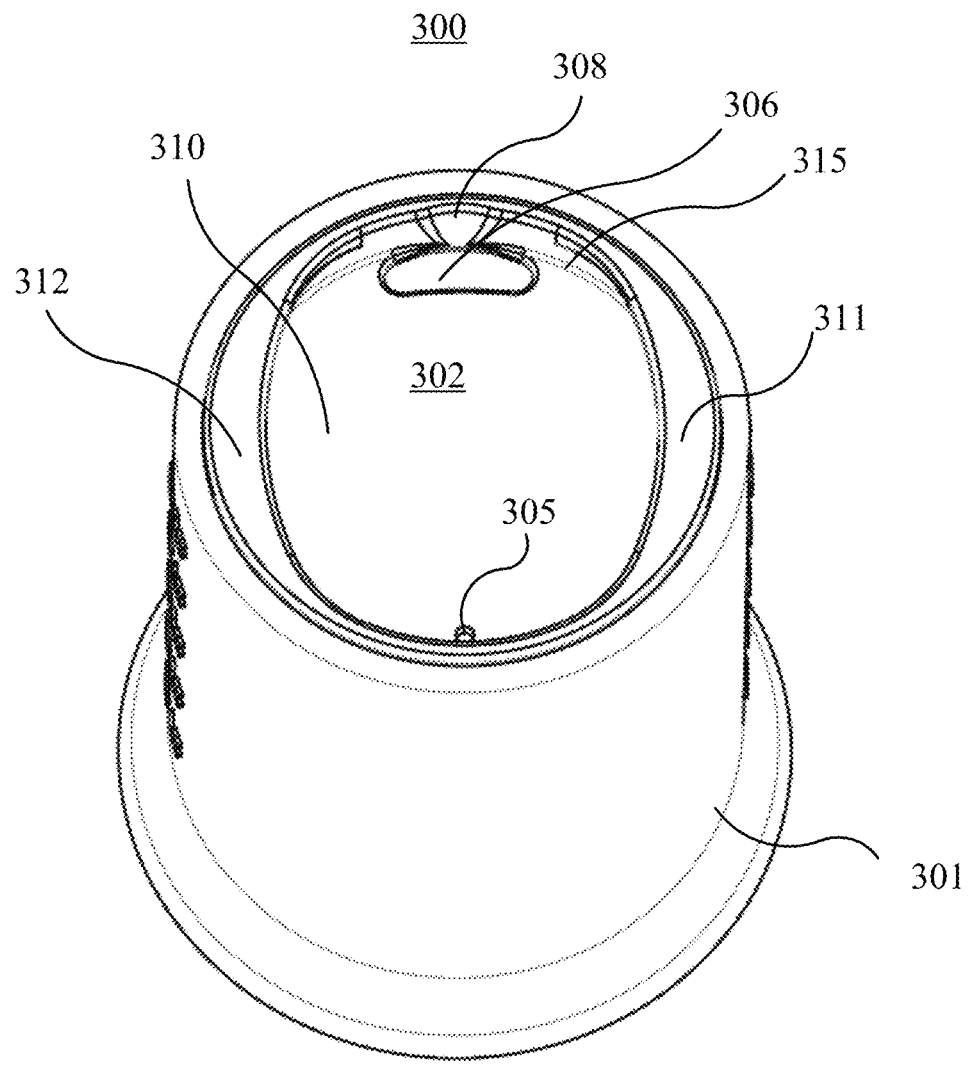
FIG. 34 is a schematic illustration of another perspective view of a drinking cup assembly, according to an embodiment of the present disclosure.
Figure 35:
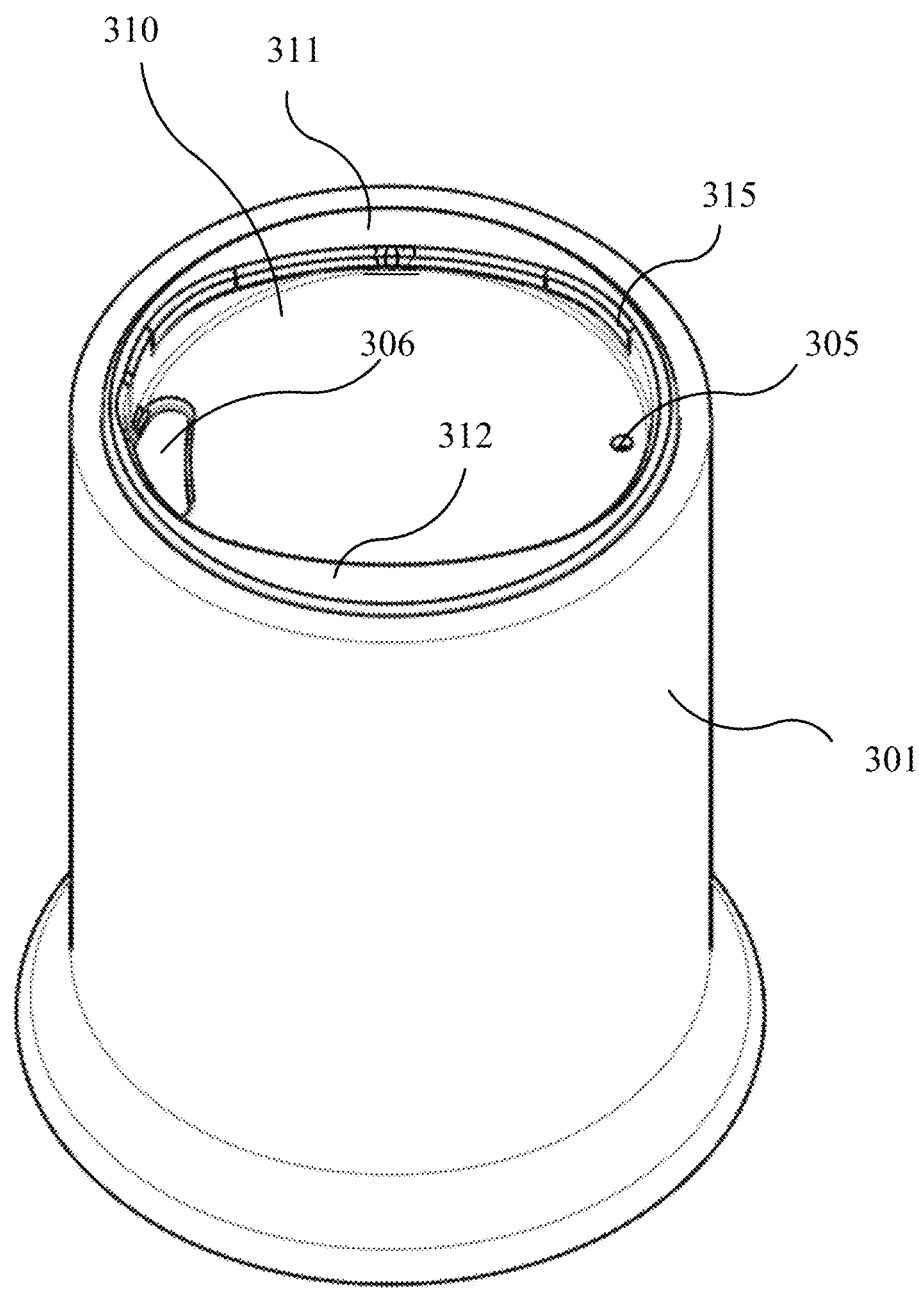
FIG. 35 is a schematic illustration of another perspective view of a drinking cup assembly, according to an embodiment of the present disclosure.
Figure 36:
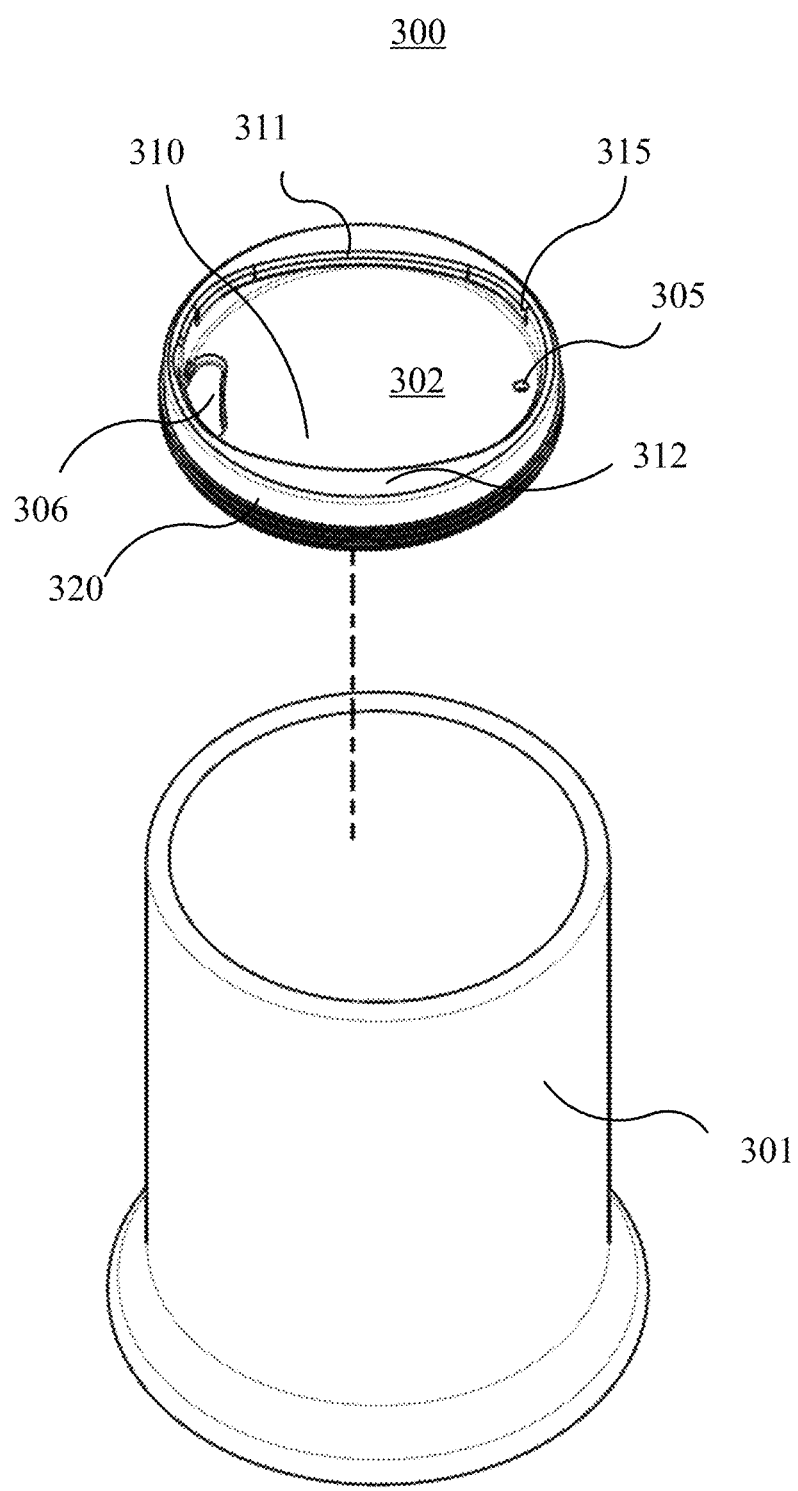
FIG. 36 is a schematic illustration of an exploded, perspective view of a drinking cup assembly, according to an embodiment of the present disclosure.

FIG. 34 is a schematic illustration of another perspective view of the drinking cup assembly 300, as viewed from a side opposite to the viewing side of FIG. 33. FIG. 35 is a schematic illustration of another perspective view of the drinking cup assembly 300, as viewed from a side that is about 90 degrees from the viewing side of FIG. 33. FIG. 36 is a schematic illustration of an exploded, perspective view of the drinking cup assembly 300. As shown in FIG. 36, the lid 302 may include a substantially cylindrical or round body 320. During an assembly, the lid 302 may be pressed into the opening of the cup 301. During a disassembly, the lid 302 may be pulled out of the cup 301, for example, by pulling the first flange 311 and/or the second flange 312. The first flange 311 and the second flange 312 may extend from a top portion of the body 320 toward the center of the lid 302.

Figure 37:
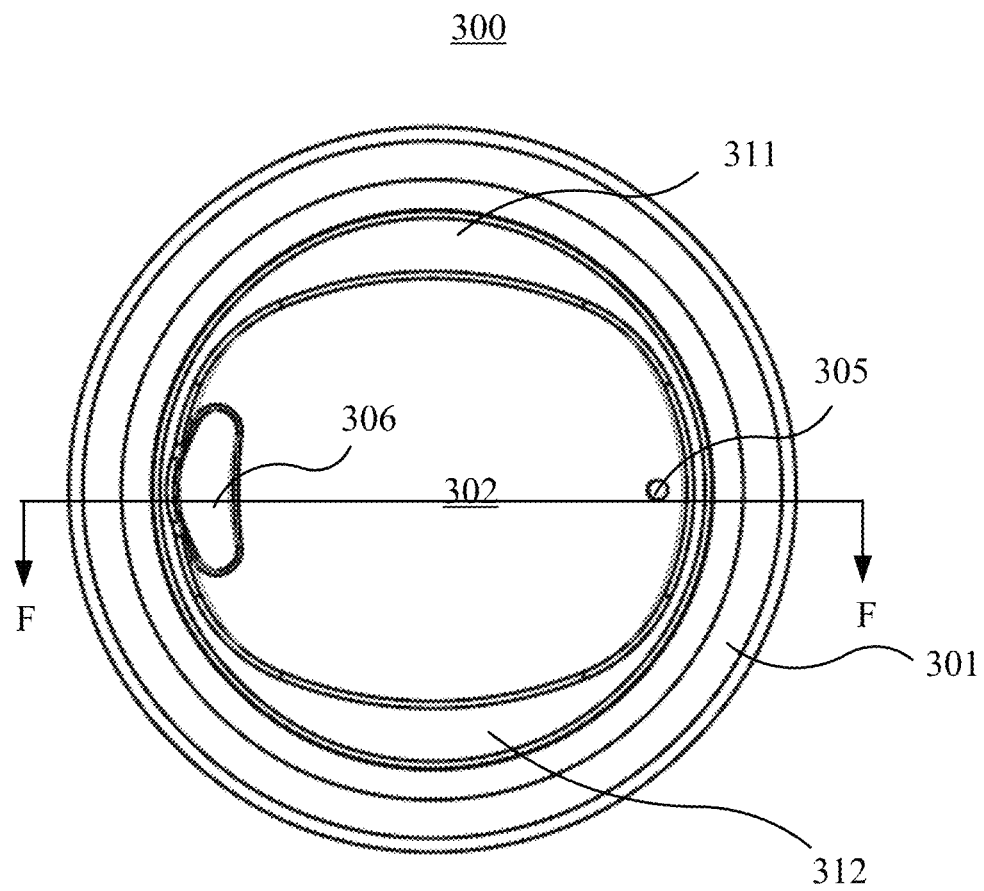
FIG. 37 is a schematic illustration of a top view of a drinking cup assembly, according to an embodiment of the present disclosure.
Figure 38:
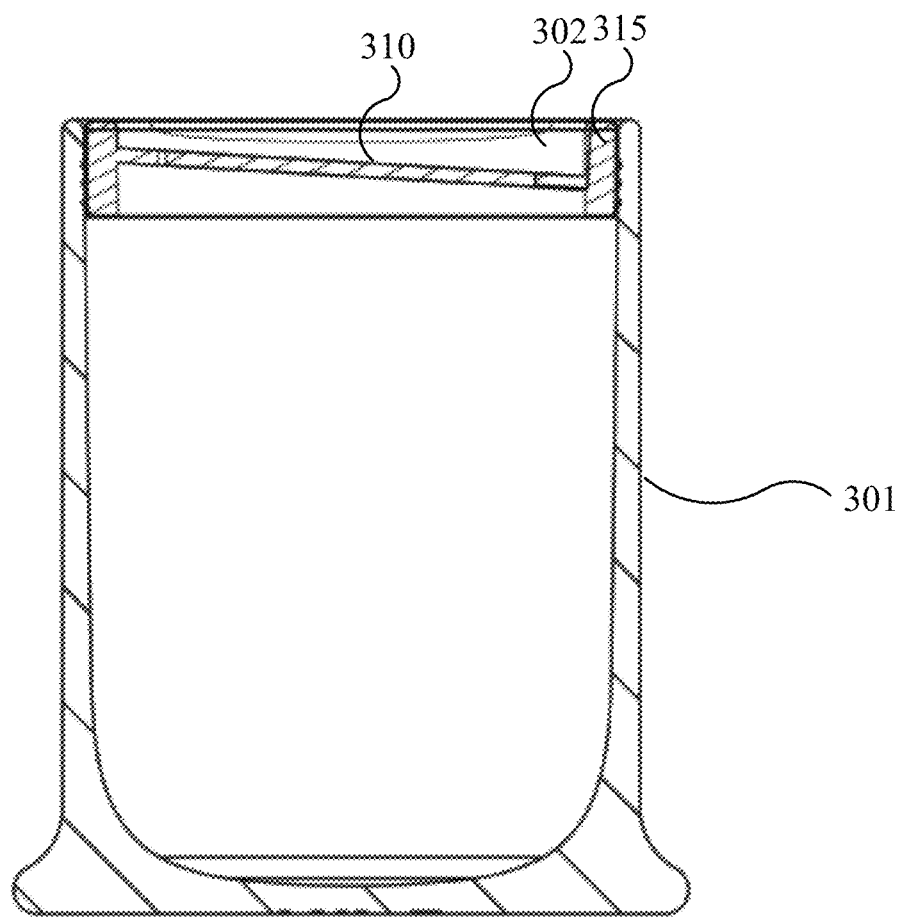
FIG. 38 is a schematic illustration of a cross-sectional view of a drinking cup assembly, according to an embodiment of the present disclosure.

FIG. 37 is a schematic illustration of a top view of the drinking cup assembly 300. FIG. 38 is a schematic illustration of a cross-sectional view of the drinking cup assembly 300 taken from the F-F line shown in FIG. 37. As shown in FIG. 38, the center plate 310 is slanted lower toward the second hole 306 such that any liquid spilled onto the center plate 310 may flow back to the cup 301 through the second hole 306 and the slanted center plate 310.

Figure 39:
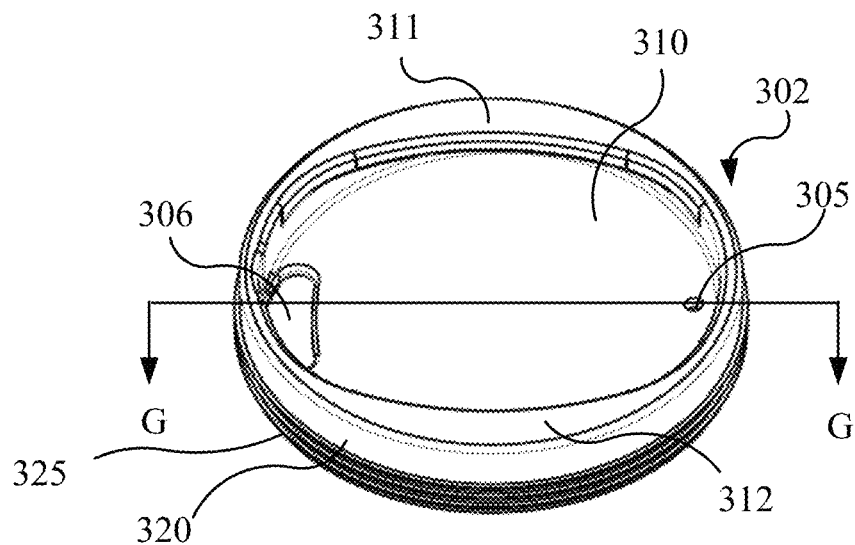
FIG. 39 is a schematic illustration of a top perspective view of a lid, according to an embodiment of the present disclosure.
Figure 40:
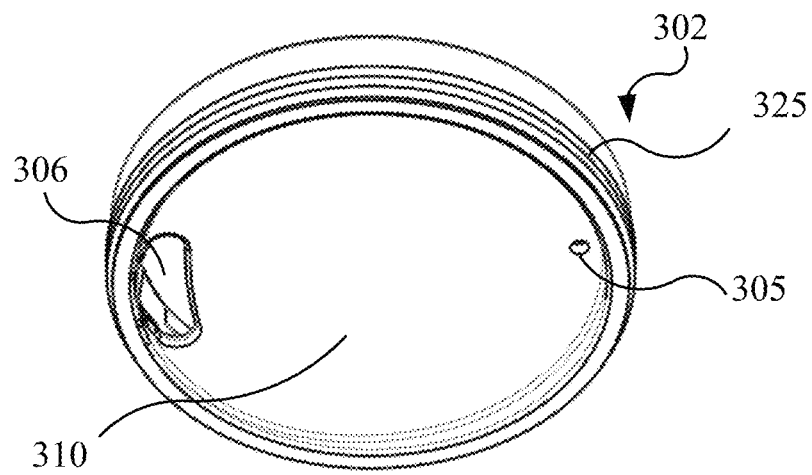
FIG. 40 is a schematic illustration of a bottom perspective view of a lid, according to an embodiment of the present disclosure.

FIG. 39 is a schematic illustration of a top perspective view of the lid 302. As shown in FIG. 39, a lower portion of the body 320 may include a plurality of threaded protrusions 325 protruding from an exterior surface of the body 320, which may increase friction when the lid 302 is press-fitted with the cup 301. FIG. 40 is a schematic illustration of a bottom perspective view of the lid 302.

Figure 41:
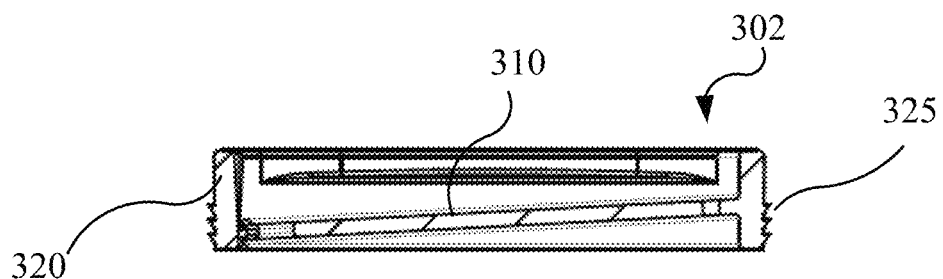
FIG. 41 is a schematic illustration of a cross-sectional view of a lid, according to an embodiment of the present disclosure.

FIG. 41 is a schematic illustration of a cross-sectional view of the lid 302 taken alone the G-G line in FIG. 39. The cross-sectional view shows the threaded protrusions 325. The shapes of the threaded protrusions 325 are not limited to the shapes shown in FIG. 41, and may be any suitable shapes. The number of rows of the threaded protrusions 325 may be any suitable number, e.g., one, two, three, etc. The cross-sectional view also shows the slanted center plate 310, that is lower at the second hole 306 and higher at the first hole 305.

Figure 42:
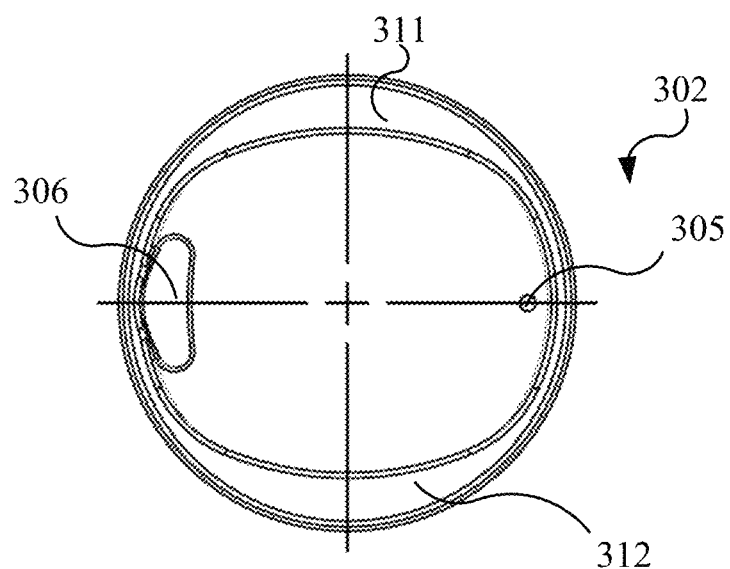
FIG. 42 is a schematic illustration of a top view of a lid, according to an embodiment of the present disclosure.
Figure 43:
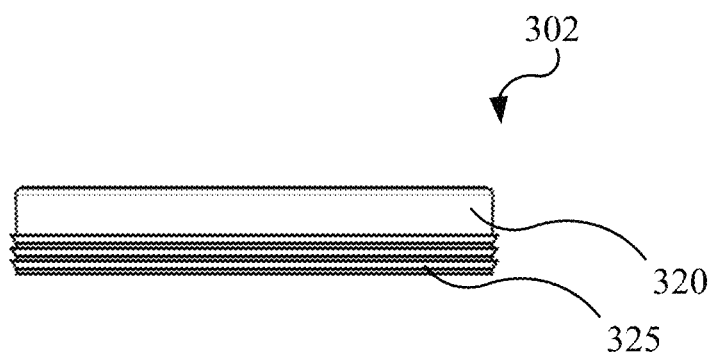
FIG. 43 is a schematic illustration of a side view of a lid, according to an embodiment of the present disclosure.

FIG. 42 is a schematic illustration of a top view of the lid 302. FIG. 43 is a schematic illustration of a side view of the lid 302 taken from any side since the body 320 has a round shape. The side view shown in FIG. 43 can be any side, since the views are the same.

Figure 44:
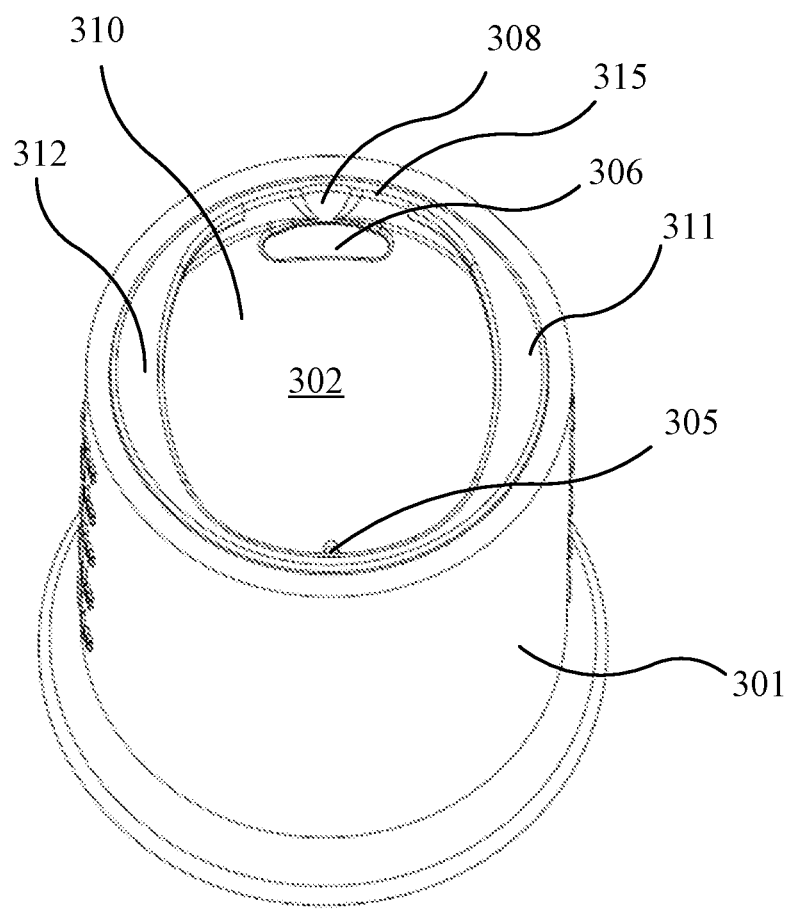
FIG. 44 is a schematic illustration of a perspective view of a drinking cup assembly, according to an embodiment of the present disclosure.
Figure 45:
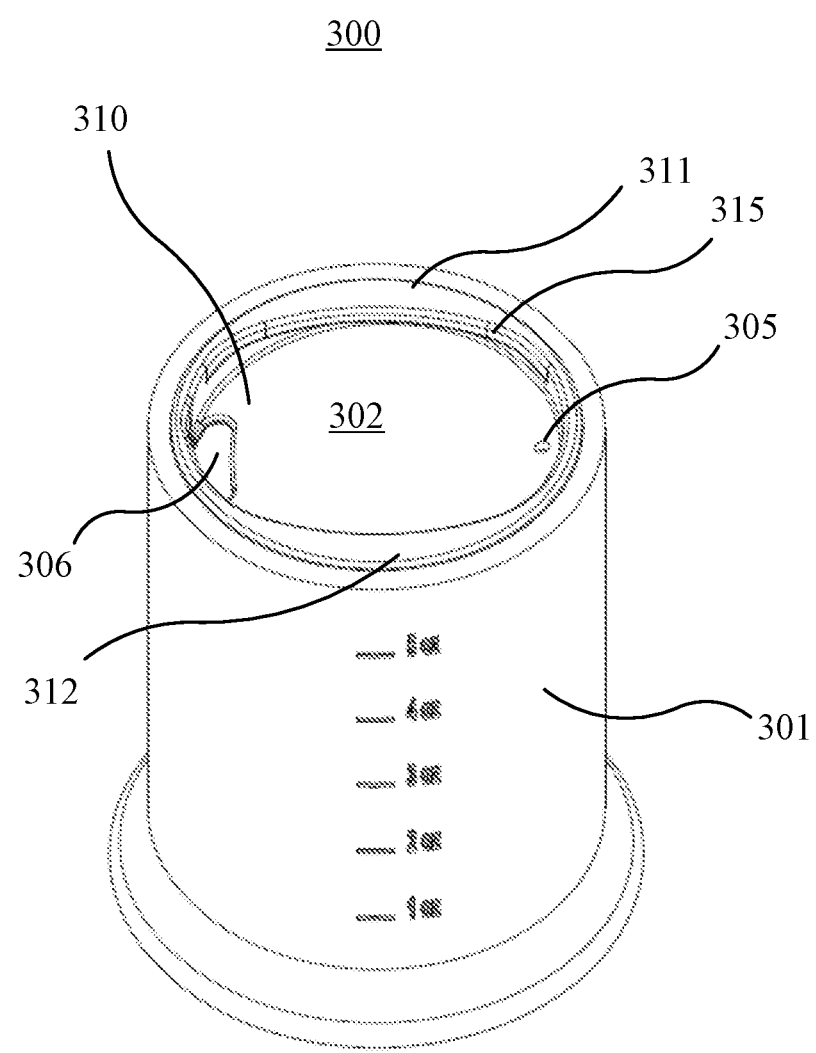
FIG. 45 is a schematic illustration of another perspective view of a drinking cup assembly, according to an embodiment of the present disclosure.
Figure 46:
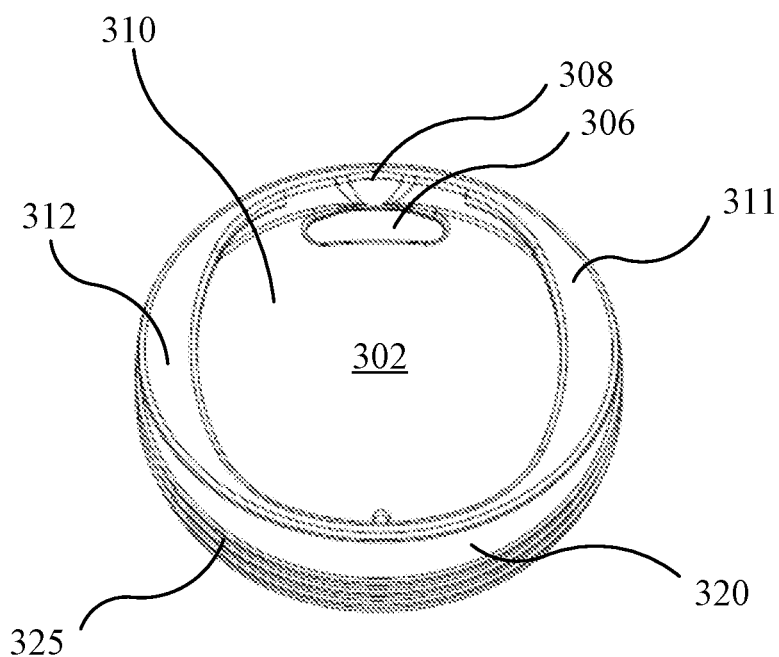
FIG. 46 is a schematic illustration of a perspective view of a lid, according to an embodiment of the present disclosure.
Figure 47:
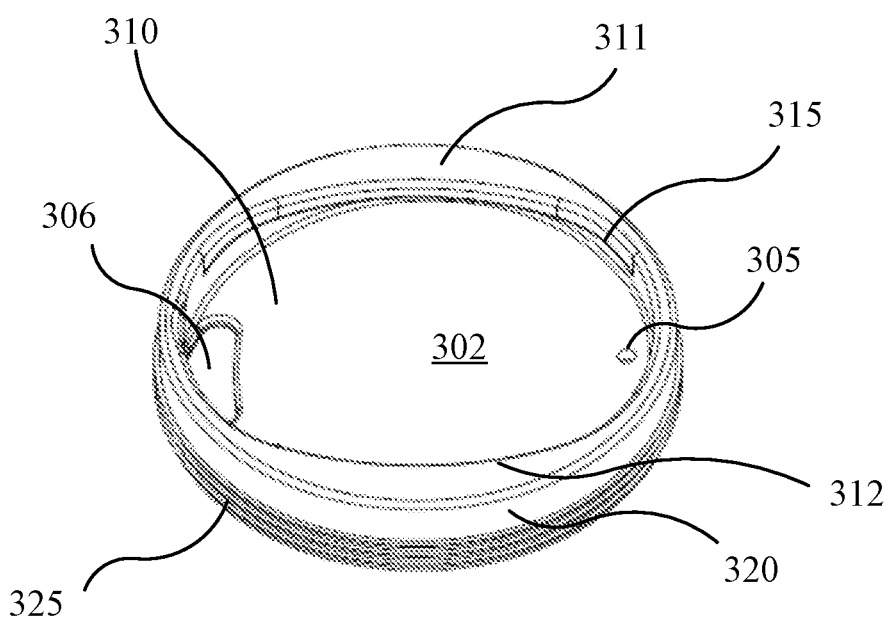
FIG. 47 is a schematic illustration of another perspective view of a lid, according to an embodiment of the present disclosure.
Figure 48:
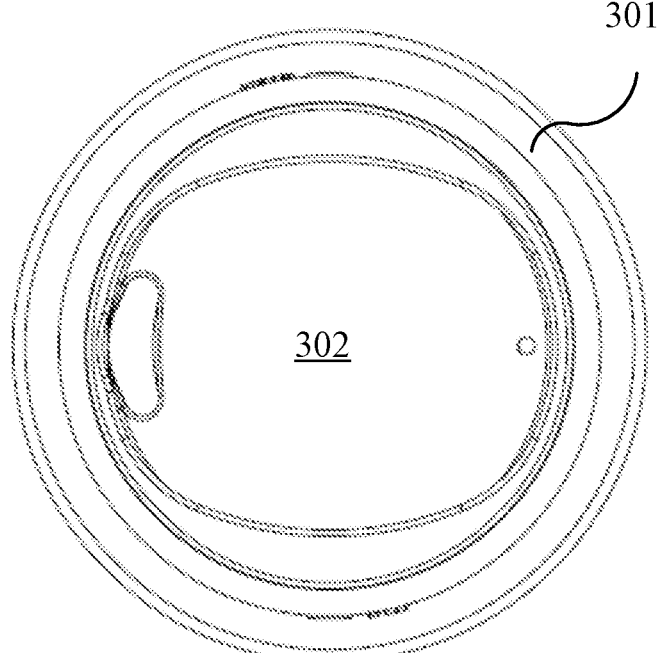
FIG. 48 is a schematic illustration of a top view of a drinking cup assembly, according to an embodiment of the present disclosure.

FIG. 44 is a schematic illustration of another perspective view of the drinking cup assembly 300. FIG. 45 is a schematic illustration of another perspective view of the drinking cup assembly 300, as viewed from a direction that is about 90 degrees from the view of FIG. 44. FIG. 46 is a schematic illustration of a perspective view of the lid 302. FIG. 47 is a schematic illustration of another perspective view of the lid 302, as viewed from a direction that is rotated about 90 degrees from the viewing direction of FIG. 45. FIG. 48 is a schematic illustration of a top view of the drinking cup assembly 300.

Figure 49:
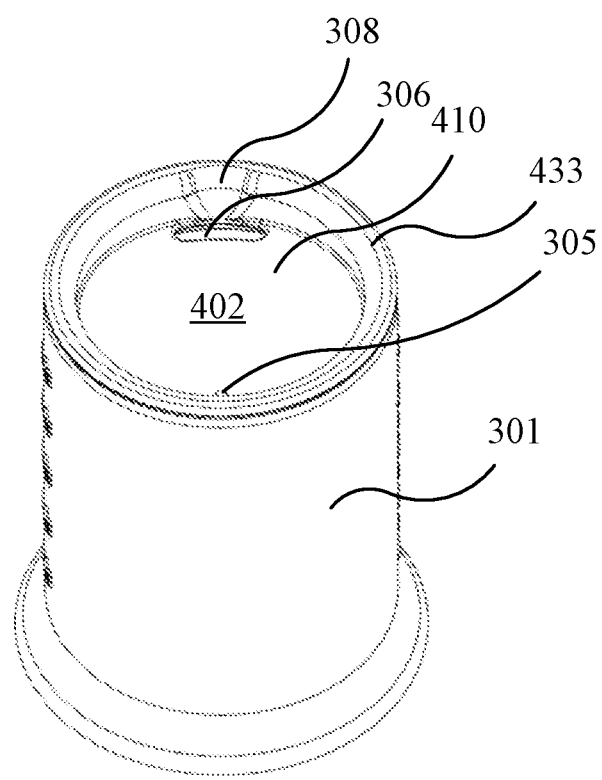
FIG. 49 is a schematic illustration of a perspective view of a drinking cup assembly, according to another embodiment of the present disclosure.

FIG. 49 is a schematic illustration of a perspective view of another drinking cup assembly 400. The drinking cup assembly 400 may include a cup 301 and a lid 402. The lid 402 may include elements or structures that are similar to those included in the lid 302, except that the lid 402 does not include the first flange 311 and the second flange 312 that are included in the lid 302. In addition, the lid 302 may include a circumferential top flange 433 disposed at a circumference of a top portion of the body of the lid 402, and extending from the top portion of the body of the lid 402 outwardly to cover the top portion of the cup 301. The circumferential top flange 433 may be used for grabbing by a user to separate the lid 402 from the cup 301. In the lid 302 shown in FIG. 36, the body 320 does not include the circumferential top flange 433. That is, the top surface of the body 320 of the lid 302 may be flush with the top surface of the cup 301. In the embodiment of the lid 302, the grabbing function is provided by the first flange 311 and the second flange 312 that extend from the top portion of the body of the lid 302 inwardly toward the center of the lid 302.

Figure 50:
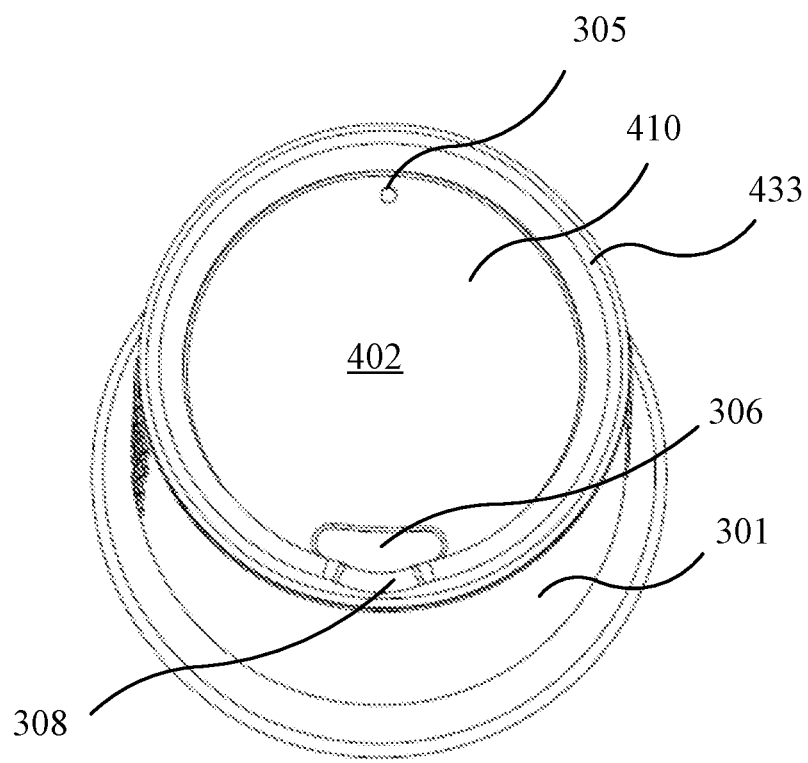
FIG. 50 is a schematic illustration of another perspective view of a drinking cup assembly, according to an embodiment of the present disclosure.
Figure 51:
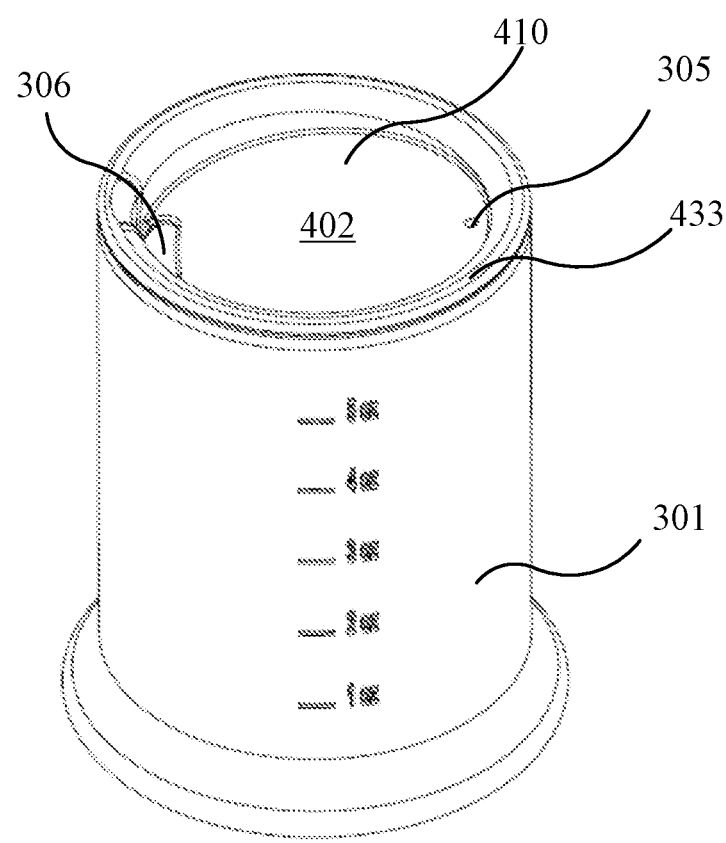
FIG. 51 is a schematic illustration of another perspective view of a drinking cup assembly, according to an embodiment of the present disclosure.
Figure 52:
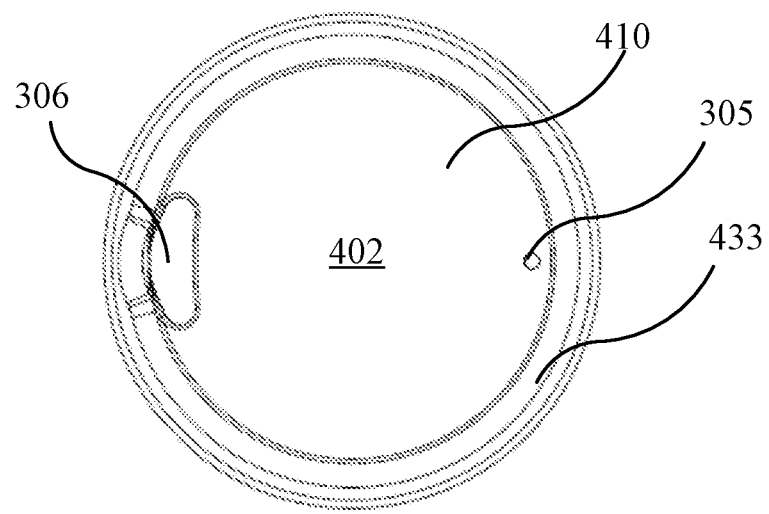
FIG. 52 is a schematic illustration of a top view of a lid, according to an embodiment of the present disclosure.
Figure 53:
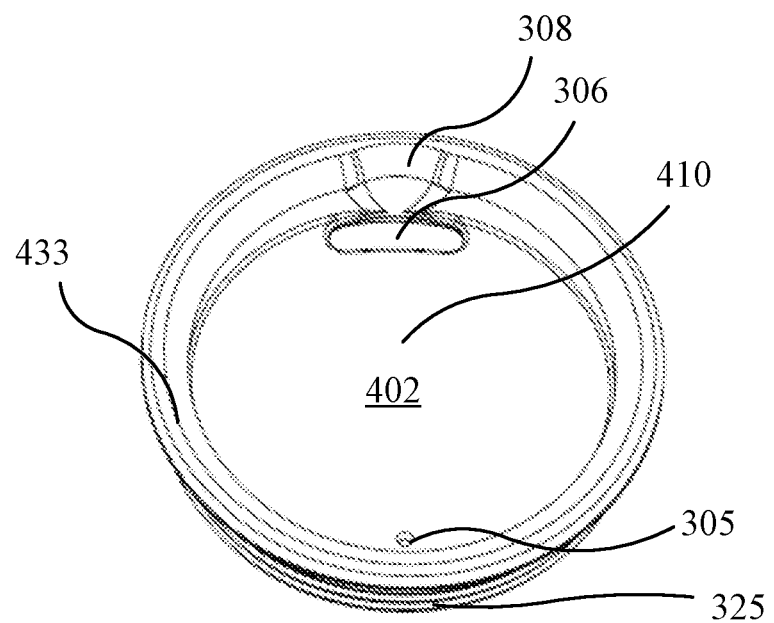
FIG. 53 is a schematic illustration of a perspective view of a lid, according to an embodiment of the present disclosure.
Figure 54:
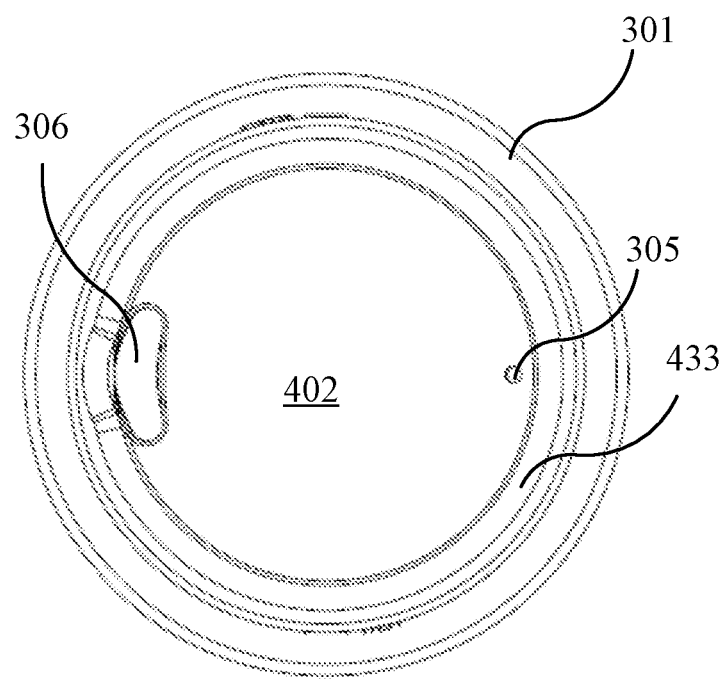
FIG. 54 is a schematic illustration of a top view of a drinking cup assembly, according to an embodiment of the present disclosure.

FIG. 50 is a schematic illustration of another perspective view of the drinking cup assembly 400. The horizontal viewing direction in FIG. 50 is rotated about 180 degrees from the view shown in FIG. 49. FIG. 51 is a schematic illustration of another perspective view of the drinking cup assembly 400. The horizontal viewing direction in FIG. 51 is rotated about 90 degrees from the view shown in FIG. 50. As shown in FIG. 51, the circumferential top flange 433 covers the top portion of the cup 301. FIG. 52 is a schematic illustration of a top view of the lid 402. FIG. 53 is a schematic illustration of a perspective view of the lid 402. As shown in FIG. 53, the body of the lid 402 may include threaded protrusions 325. FIG. 54 is a schematic illustration of a top view of the drinking cup assembly 400.

Figure 55:
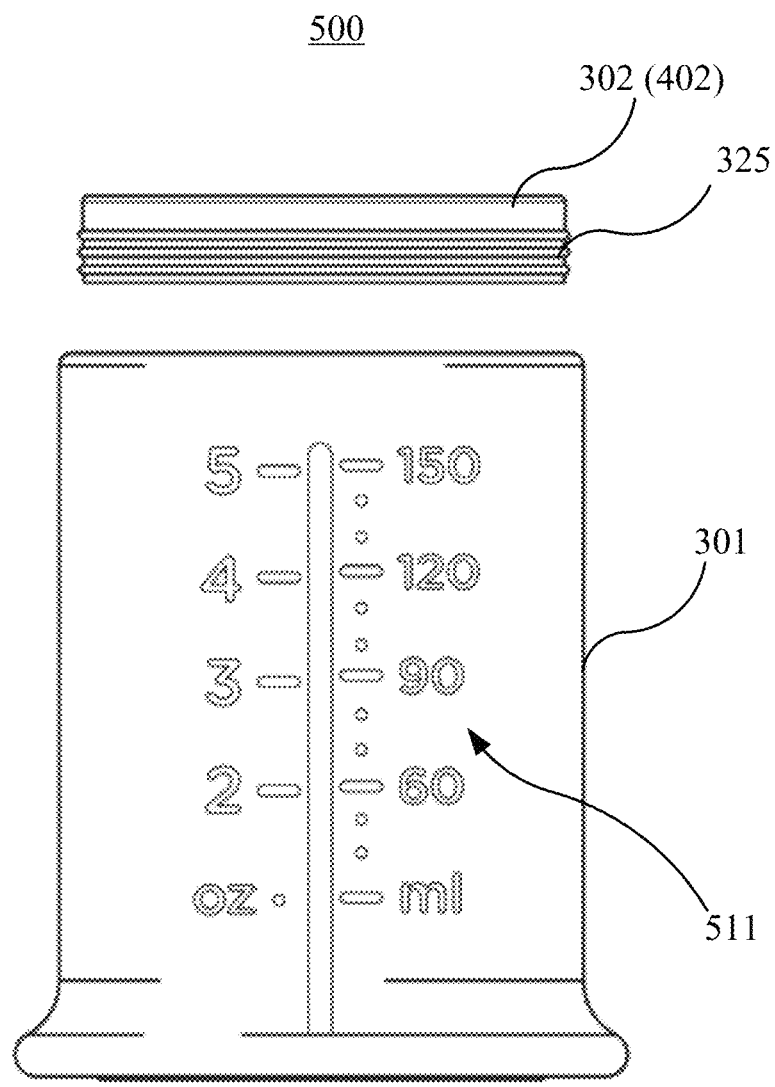
FIG. 55 is a schematic illustration of a front view of a drinking cup assembly, according to an embodiment of the present disclosure.

FIG. 55 is a schematic illustration of a front view of a drinking cup assembly 500, with the lid separated from the cup for illustration purposes (i.e., when the lid is unassembled from the cup). The drinking cup assembly 500 may be the drinking cup assembly 300 or 400 described above. In the example shown in FIG. 55, the cup 301 may include a plurality of measurement indicators 511. The measurement indicators 511 are shown to be in the configuration that is similar to the configuration shown in FIG. 21. In other embodiments, the measurement indicators 511 may be similar to the configuration shown in FIGS. 1 and 2.

Figure 56:
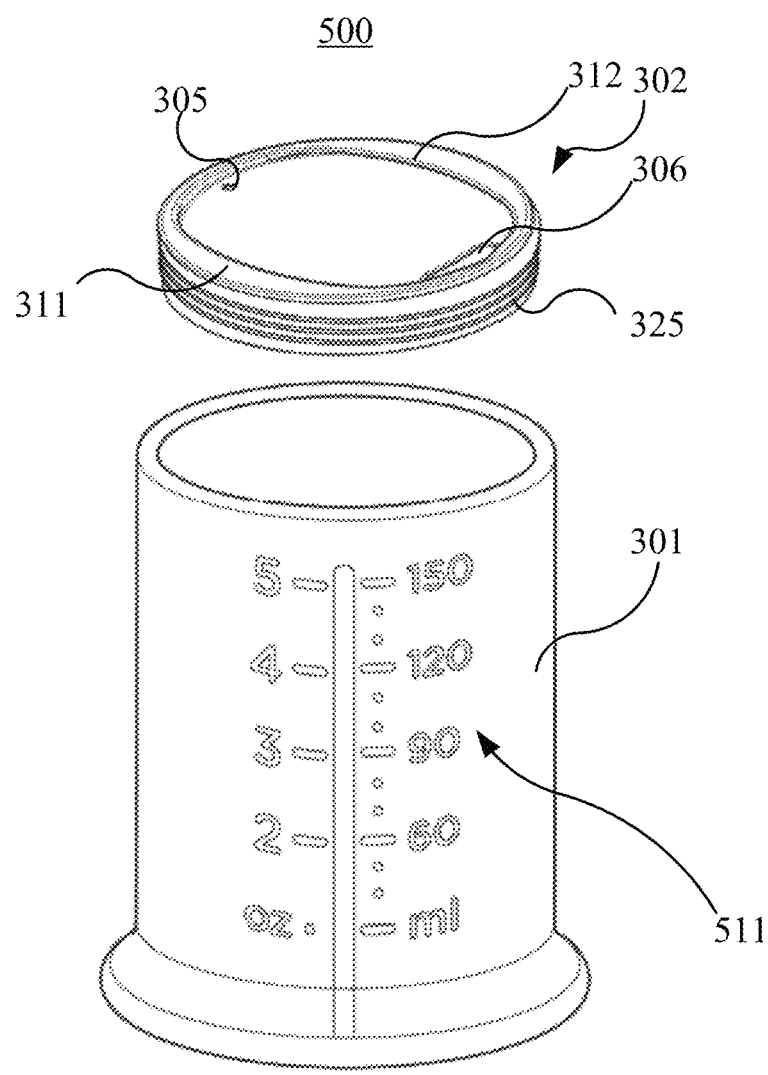
FIG. 56 is a schematic illustration of an exploded perspective view of a drinking cup assembly, according to an embodiment of the present disclosure.
Figure 57:
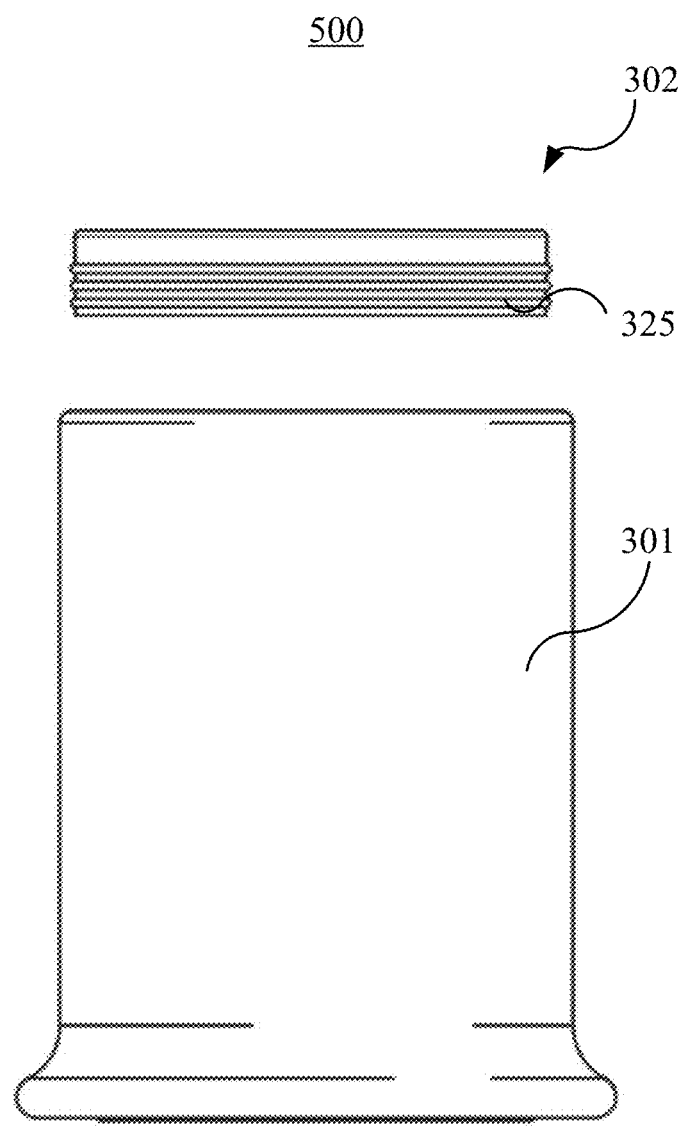
FIG. 57 is a schematic illustration of an exploded back view of a drinking cup assembly, according to an embodiment of the present disclosure.

FIG. 56 is a schematic illustration of an exploded perspective view of the drinking cup assembly 500. In the embodiment shown in FIG. 56, the lid 302 is used as an example. FIG. 57 is a schematic illustration of an exploded back view of the drinking cup assembly 500 showing a side of the cup 301 opposite to the side shown in FIG. 56, where measurement indicators are not provided on the exterior surface of the cup 301.

The disclosed cups or drinking cup assemblies may be used for containing a liquid. For example, the disclosed cup and drinking cup assembly may be used for drinking purposes. A user may use the cup to drink water, juice, milk, medicine, or any other suitable liquid that is safe for the silicone material. The cup and drinking cup assembly may be used by a baby or young children to drink water, milk, baby formula, etc. The cup and drinking cup assembly may be used by an elderly or a patient to drink liquid medicine, such as herb soups of Chinese medicine. The cup and drinking cup assembly may be used for drinking wine, alcohol, etc. When a liquid is poured into the cup 100, due to the disclosed measurement indicators provided at the exterior surface of the cup, the volume of the liquid may be readily observable by the user. The cup and drinking cup assembly may be used in training a young children to drink by him/her-self. With the lid, liquid may not be easily spilled. With the translucent body and the measurement indicators, a young child may become more interested in drinking by him/her-self. The silicone material is soft. Thus, the cup and the drinking cup assembly may be damage-proof when accidentally knocked over by the young child. In addition, the silicone is soft. A young child may squeeze the body of the cup to observe the change of the liquid level through the measurement indicators, which further increases the interest of the young child to use the cup during training. The cup may also be used in any suitable scenario to measure the volume of a liquid, such as for baking purposes.

The cup and drinking cup assembly may be used as training cup to help young children to transition from bottles (e.g., baby formula bottles) to drinking cups. The silicone, which is soft, can help avoid potential teeth damage from drinking using a cup made of a hard material, such as plastic and glass. The transparent measurement indicators provided on the cup body can provide visibility to the young children and may reduce any anxiety the young children may have from drinking a liquid that may be unknown to the young children when contained in a solid cup, a cup that is neither translucent nor transparent, or a cup that does not provide a visible window or measurement scale. The disclosed cup and drinking cup assembly may facilitate the transition for the young children, and may also allow parents to monitor liquid consumption.

Other embodiments of the present disclosure will be apparent to those skilled in the art from consideration of the specification and practice of the embodiments disclosed herein. It is intended that the specification and examples be considered as example only and not to limit the scope of the present disclosure, with a true scope and spirit of the invention being indicated by the following claims. Variations or equivalents derived from the disclosed embodiments also fall within the scope of the present disclosure.

What is claimed is:

1. A drinking cup assembly, comprising:
   a cup; and
   a lid coupled with a top portion of the cup,
   wherein the cup includes:
      a body having a cylindrical shape with a substantially constant outer diameter in a vertical direction, the body including a plurality of measurement indicators provided at an exterior surface of the body; and
      a base integrally formed with the body and having a diameter greater than the outer diameter of the cylindrical shape of the body,
   wherein the body and the base are formed based on a silicone material, and
   wherein circular portions of an interior surface and the exterior surface of the body at locations corresponding to the measurement indicators are transparent, and remaining portions of the interior and the exterior surfaces of the body are translucent, and
   wherein the lid includes:
      a cylindrical body made of the silicone material and including a plurality of parallel rows of threaded protrusions protruding from an exterior surface of the cylindrical body;
      a slanted center plate made of the silicone material and having a hole configured for drinking; and
      a first flange and a second flange disposed at opposite sides of the cylindrical body and extending from a top portion of the cylindrical body inwardly toward a center of the slanted center plate.

2. The drinking cup assembly of claim 1, wherein the slanted center plate is slanted lower toward the hole configured for drinking.

3. A drinking cup assembly, comprising:
   a cup including:
      a body having a cylindrical shape with a substantially constant outer diameter in a vertical direction, the body including a plurality of measurement indicators provided at an exterior surface of the body; and
      a base integrally formed with the body and having a diameter greater than the outer diameter of the cylindrical shape of the body,
   wherein the body and the base are formed based on a silicone material, and
   wherein circular portions of an interior surface and the exterior surface of the body at locations corresponding to the measurement indicators are transparent, and remaining portions of the interior and the exterior surfaces of the body are translucent, and
   a lid configured to be coupled with the cup, the lid including:
      a cylindrical body made of the silicone material and including a plurality of parallel rows of threaded protrusions protruding from an exterior surface of the cylindrical body;
      a slanted center plate made of the silicone material and having a hole configured for drinking; and
      a circumferential top flange disposed at a circumference of a top portion of the cylindrical body, and extending from the top portion of the cylindrical body outwardly to cover a top portion of the cup.

4. The drinking cup assembly of claim 3, wherein the slanted center plate is slanted lower toward the hole configured for drinking.

* * * * *